United States Patent
Usuda et al.

(10) Patent No.: US 10,742,221 B2
(45) Date of Patent: *Aug. 11, 2020

(54) CIRCUIT DEVICE, OSCILLATOR, PHYSICAL QUANTITY MEASUREMENT DEVICE, ELECTRONIC APPARATUS, AND VEHICLE

(71) Applicant: Seiko Epson Corporation, Tokyo (JP)

(72) Inventors: Toshiya Usuda, Ina (JP); Masayuki Kamiyama, Chino (JP)

(73) Assignee: Seiko Epson Corporation (JP)

( * ) Notice: Subject to any disclaimer, the term of this patent is extended or adjusted under 35 U.S.C. 154(b) by 42 days.

This patent is subject to a terminal disclaimer.

(21) Appl. No.: 15/875,006

(22) Filed: Jan. 19, 2018

(65) Prior Publication Data

US 2018/0212609 A1 Jul. 26, 2018

(30) Foreign Application Priority Data

Jan. 24, 2017 (JP) .................................. 2017-010046

(51) Int. Cl.
| | |
|---|---|
| *H03B 5/32* | (2006.01) |
| *H03L 1/02* | (2006.01) |
| *H04L 9/32* | (2006.01) |
| *H03B 5/36* | (2006.01) |

(52) U.S. Cl.
CPC ............ *H03L 1/026* (2013.01); *H03B 5/366* (2013.01); *H03L 1/025* (2013.01); *H03L 1/028* (2013.01); *H04L 9/3278* (2013.01)

(58) Field of Classification Search
CPC .... G06F 1/14; H03B 5/30; H03B 5/32; H03B 5/36; H03B 5/362; H03B 5/364; H03B 5/366; H03B 5/368; H03L 1/02; H03L 1/022; H03L 1/023; H03L 1/025; H03L 1/026; H03L 1/028; H04L 9/3278
USPC .................................. 331/66, 154, 158, 176
See application file for complete search history.

(56) References Cited

U.S. PATENT DOCUMENTS

| | | | | | |
|---|---|---|---|---|---|
| 4,453,834 | A | * | 6/1984 | Suzuki | G04G 3/022 331/111 |
| 4,893,097 | A | * | 1/1990 | Zwack | H03L 1/025 331/176 |
| 4,922,212 | A | * | 5/1990 | Roberts | H03L 1/026 331/158 |
| 4,949,055 | A | * | 8/1990 | Leitl | H03L 1/025 331/158 |

(Continued)

FOREIGN PATENT DOCUMENTS

JP    2010-225009 A    10/2010

OTHER PUBLICATIONS

S. Eiroa et al., "Circuit Authentication based on Ring Oscillator PUFs", 2011 18th IEEE International Conference on Electronics, Circuits, and Systems, IEEE, pp. 691-694 (2011).

*Primary Examiner* — Levi Gannon
(74) *Attorney, Agent, or Firm* — Harness, Dickey & Pierce, P.L.C.

(57) ABSTRACT

A circuit device includes an oscillation circuit that generates an oscillation signal by using an resonator, a processing circuit that controls the oscillation circuit, and a storage circuit that stores temperature compensation data of an oscillation frequency of the oscillation signal. The processing circuit generates specific PUF information of the circuit device on the basis of the temperature compensation data.

16 Claims, 14 Drawing Sheets

(56) References Cited

U.S. PATENT DOCUMENTS

| | | | |
|---|---|---|---|
| 5,548,252 A * | 8/1996 | Watanabe | H03L 1/025 331/116 FE |
| 5,574,408 A * | 11/1996 | Zwack | H03L 1/026 331/158 |
| 5,617,084 A * | 4/1997 | Sears | G08C 15/00 331/176 |
| 5,740,525 A * | 4/1998 | Spears | H03J 1/0033 455/196.1 |
| 5,781,073 A * | 7/1998 | Mii | H03L 1/026 331/176 |
| 5,892,408 A * | 4/1999 | Binder | H03L 1/026 331/176 |
| 9,444,618 B1 * | 9/2016 | Trimberger | H04L 9/002 |
| 9,762,241 B1 | 9/2017 | Augustine et al. | |
| 2003/0204743 A1 | 10/2003 | Devadas et al. | |
| 2012/0212253 A1 | 8/2012 | Lewis | |
| 2013/0187764 A1 | 7/2013 | Smith | |
| 2015/0042410 A1 * | 2/2015 | Yoneyama | H03B 5/04 331/158 |
| 2015/0046715 A1 * | 2/2015 | Ignatchenko | G06F 21/44 713/176 |
| 2015/0053006 A1 | 2/2015 | Decoux et al. | |
| 2016/0110571 A1 | 4/2016 | Jung et al. | |
| 2017/0310688 A1 * | 10/2017 | Lecomte | G09C 1/00 |
| 2018/0131529 A1 | 5/2018 | Cambou | |

* cited by examiner

| address | data Dm ... D2 D1 |
|---|---|
| 0 | DATA0 |
| 1 | DATA1 |
| 2 | DATA2 |
| 3 | DATA3 |
| ⋮ | ⋮ |
| 127 | DATA127 |

FIG. 8

| | component | parameter | address region in which variation easily occurs |
|---|---|---|---|
| Example 1 | resonator | secondary coefficient of temperature characteristic | address on low temperature side (vicinity of address 0), address on high temperature side (vicinity of address 127) |
| Example 2 | resonator | peak temperature of temperature characteristic | address on low temperature side (vicinity of address 0), address on high temperature side (vicinity of address 127) |
| Example 3 | resonator | oscillation frequency at 25°C | middle temperature address (vicinity of address 63) |
| Example 4 | resonator | pace characteristic of capacitance value | address on low temperature side (vicinity of address 0), address on high temperature side (vicinity of address 127) |
| Example 5 | circuit device | A/D accuracy (accuracy of temperature sensor) | address on low temperature side (vicinity of address 0), address on high temperature side (vicinity of address 127) |
| Example 6 | circuit device | variation in capacitance value | address on low temperature side (vicinity of address 0), address on high temperature side (vicinity of address 127) |

FIG. 10

CIRCUIT DEVICE, OSCILLATOR, PHYSICAL QUANTITY MEASUREMENT DEVICE, ELECTRONIC APPARATUS, AND VEHICLE

BACKGROUND

1. Technical Field

The present invention relates to a circuit device, an oscillator, a physical quantity measurement device, an electronic apparatus, a vehicle, and the like.

2. Related Art

In systems using an oscillator, such as a real-time clocking device, or a physical quantity measurement device, there is a possibility that hacking occurs due to, for example, spoofing or data falsification, and security measures against such hacking may be required.

The related art of the security measures in the real-time clocking device includes, for example, a technique disclosed in JP-A-2010-225009. In JP-A-2010-225009, when an external device attempts to access a real-time clocking device, the external device transmits an access code to the real-time clocking device, the real-time clocking device collates the access code with an expected value, and the real-time clocking device allows the access in a case where the access code is consistent with the expected value, and prohibits the access in a case where the access code is not consistent with the expected value.

However, authentication based on the access code is performed in the above-described related art, and thus there is a problem in that it is difficult to increase the level of security. For example, there is a concern that spoofing such as reproduction of an external device outputting the same access code is performed. Alternatively, the case is not limited to a case where an oscillator or a physical quantity measurement device authenticates an external device as in the related art, and it may be preferable that the external device can authenticate the oscillator or the physical quantity measurement device. It is preferable to increase the level of security even in this case.

SUMMARY

An advantage of some aspects of the invention is to provide a circuit device, an oscillator, a physical quantity measurement device, an electronic apparatus, a vehicle, and the like which are capable of improving the security of a system including the circuit device.

The invention can be implemented in the following forms or embodiments.

An aspect of the invention relates to a circuit device including an oscillation circuit configured to generate an oscillation signal by using an resonator, a processing circuit configured to control the oscillation circuit, and a storage circuit configured to store temperature compensation data of an oscillation frequency of the oscillation signal, in which the processing circuit generates specific Physically Unclonable Function information of the circuit device based on the temperature compensation data.

According to the aspect of the invention, the specific Physically Unclonable Function information of the circuit device is generated based on the temperature compensation data stored in the storage circuit. Thereby, for example, an external device can authenticate the circuit device on the basis of authentication information based on the Physically Unclonable Function information, or the circuit device can authenticate the external device on the basis of external device authentication information received from the external device and the Physically Unclonable Function information. The Physically Unclonable Function information is information based on an individual variation and is hardly reproduced, and thus it is possible to improve the security of a system including the circuit device by using the Physically Unclonable Function information.

In the aspect of the invention, the circuit device may further include an encoding processing circuit configured to perform an encoding process based on the Physically Unclonable Function information.

In this manner, it is possible to reduce a possibility of security being broken and to improve the security of the system, as compared to a case where unencoded data is transmitted from the circuit device to the external device or from the external device to the circuit device.

In the aspect of the invention, the processing circuit may extract data of a predetermined number of bits from the temperature compensation data to generate the Physically Unclonable Function information.

The number of bits of the temperature compensation data may be larger than the number of bits which is necessary for the maintenance of uniqueness as the Physically Unclonable Function information. According to the aspect of the invention, it is possible to generate Physically Unclonable Function information of a small number of bits from the temperature compensation data while maintaining uniqueness by extracting data of a predetermined number of bits from the temperature compensation data.

In the aspect of the invention, the oscillation circuit may include a variable capacitance circuit for temperature compensation, and the temperature compensation data may be adjustment data for adjusting a capacitance value of the variable capacitance circuit.

In this manner, the oscillation circuit includes the variable capacitance circuit for temperature compensation in which a capacitance value is adjusted by temperature compensation data, and thus can perform temperature compensation. The temperature compensation data varies depending on an individual variation of the oscillation circuit including the variable capacitance circuit or the resonator, and thus it is possible to generate PUF information on the basis of the temperature compensation data.

In the aspect of the invention, the temperature compensation data may be data in which adjustment data is stored in each of a plurality of addresses corresponding to a plurality of temperatures, and the processing circuit may generate the PUF information by using pieces of adjustment data of at least two addresses of the plurality of addresses.

The temperature compensation data has an individual variation, but there is a possibility that pieces of Physically Unclonable Function information are consistent with each other between individuals in adjustment data of one address. For this reason, it is possible to reduce a possibility that pieces of Physically Unclonable Function information are consistent with each other between individuals by using pieces of adjustment data of at least two addresses.

In the aspect of the invention, the at least two addresses may be at least two addresses of an address on a low temperature side, an address on a high temperature side, and an address between the address on the low temperature side and the address on the high temperature side among the plurality of addresses.

A variation occurs in the temperature compensation data due to individual variations of various parameters related to temperature compensation. Among these, it is assumed that a variation easily occurs in adjustment data on the address on the low temperature side, the address on the high temperature side, and the address between the address on the low temperature side and the address on the high temperature side. According to the aspect of the invention, the PUF information is generated using the adjustment data on the at least two addresses among these addresses, and thus it can be expected that the uniqueness of the PUF information is improved.

In the aspect of the invention, the circuit device may further include a clock module configured to generate clocking data based on the oscillation signal, the clocking data being real-time clock information, and an interface circuit configured to output the clocking data to an external device.

According to the aspect of the invention, authentication information for causing the external device to authenticate the circuit device can be output from the circuit device to the external device, and thus it is possible to reduce a concern for spoofing of the circuit device (oscillator, physical quantity measurement device). Thereby, it is possible to improve the security of the system including the circuit device (oscillator, physical quantity measurement device).

Another aspect of the invention relates to an oscillator including any one of the circuit devices described above and a resonator.

Still another aspect of the invention relates to a physical quantity measurement device including any one of the circuit devices described above and a resonator.

Still another aspect of the invention relates to an electronic apparatus including any one of the circuit devices described above.

Still another aspect of the invention relates to a vehicle including any one of the circuit devices described above.

BRIEF DESCRIPTION OF THE DRAWINGS

The invention will be described with reference to the accompanying drawings, wherein like numbers reference like elements.

FIG. 8 illustrates an example of temperature compensation data stored in a non-volatile memory.

FIG. 10 illustrates an example of the selection of an address when specific information is generated.

DESCRIPTION OF EXEMPLARY EMBODIMENTS

Hereinafter, a preferred exemplary embodiment of the invention will be described in detail. Meanwhile, this exemplary embodiment described below is not unduly limited to the contents of the invention described in the appended claims, and all configurations described in this exemplary embodiment are not necessarily essential as solving means of the invention.

Hereinafter, a description will be given of an example of a case where an oscillator is a real-time clocking device. However, the invention is not limited thereto, and can also be applied to various oscillators (oscillator such as a temperature compensated crystal oscillator (TCXO)), a physical quantity measurement device (for example, a time-to-digital converter) using a resonator, and the like.

1. Circuit Device

For example, a system including a CPU which is an external device and a real-time clocking device transmitting clocking data to the CPU is considered. In such a system, spoofing such as replacement of the CPU mounted on a substrate with a fraudulent device or communication with the real-time clocking device by disguise like communication from the CPU is assumed. Alternatively, spoofing such as replacement of the real-time clocking device mounted on the substrate with the fraudulent device or communication with the CPU by disguise like communication from the real-time clocking device is assumed.

In a case where such fraudulence is performed, there is a possibility that, for example, clocking data of the real-time clocking device is rewritten at a fraudulent date and time or fraudulent clocking data is transmitted to the CPU. When such fraudulent communication is performed, there is a possibility that hacking such as causing the CPU to perform erroneous authentication by using the past electronic signature (which was supposed to be invalid) is performed.

For example, in a vehicle such as an automobile, an internal network and an external network (or an external device) of the vehicle communicate with each other through various communications such as mobile communication, Bluetooth (registered trademark) communication, and wired communication. There is a concern that the internal network is hacked through such communication, and the above-described spoofing of the CPU or the real-time clocking device is performed.

Figure 1:
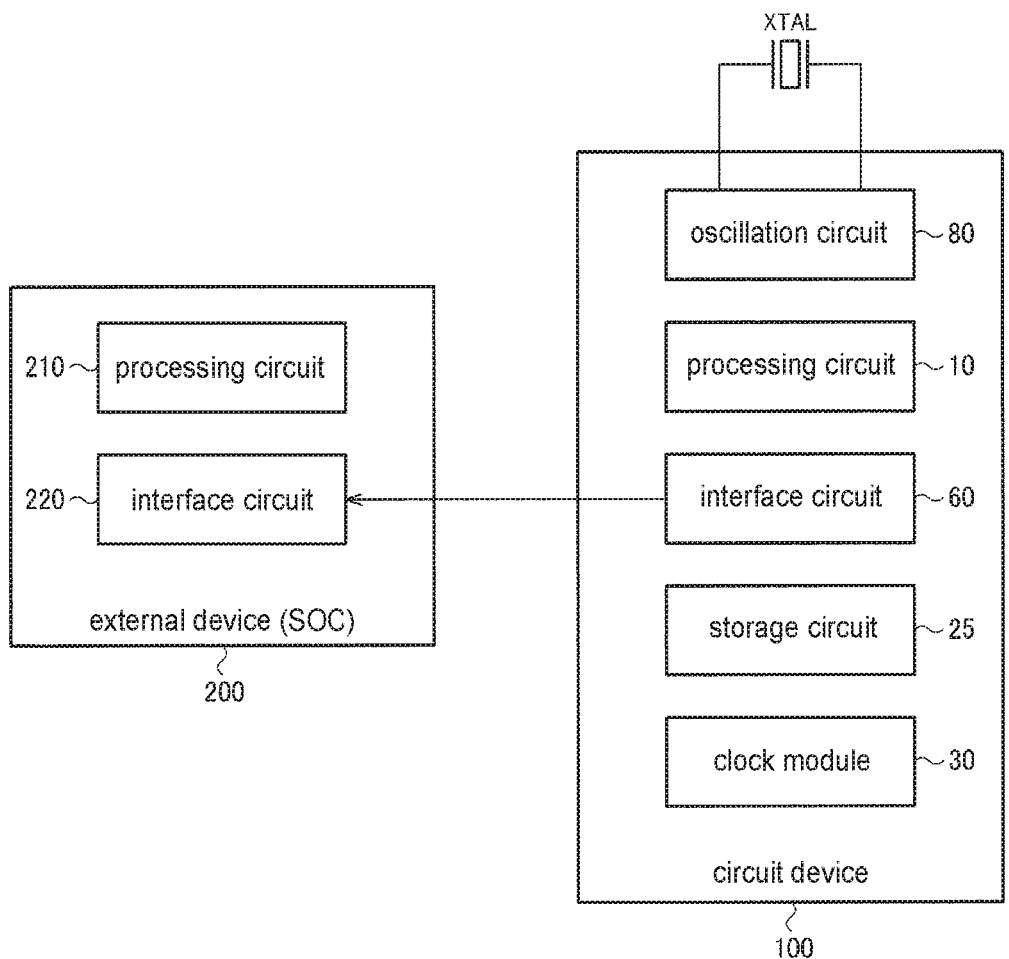
FIG. 1 illustrates a configuration example of a circuit device according to this exemplary embodiment.

FIG. 1 illustrates a configuration example of a circuit device according to this exemplary embodiment capable of solving such a problem, and a system including the circuit device. The system of FIG. 1 includes an external device 200 and a circuit device 100. The external device 200 includes a processing circuit 210 and an interface circuit 220. The circuit device 100 includes an oscillation circuit 80, a processing circuit 10 (processing circuit), and a storage circuit 25 (memory). In addition, the circuit device 100 may include an interface circuit 60 (interface circuit) and a clocking unit 30. Meanwhile, the circuit device is not limited to the configuration of FIG. 1, and various modifications such as the omission of a portion of the components and the addition of other components can be made thereto.

The external device 200 may be, for example, a System On Chip (SOC). Alternatively, the external device may be a processing device such as a CPU or an MPU. The circuit device 100 can be realized by, for example, an integrated circuit device. For example, the circuit device 100 and a resonator XTAL of FIG. 1 are combined with each other to configure a real-time clocking device. Meanwhile, this exemplary embodiment is not limited to the configuration of FIG. 1, and various modifications such as the omission of a portion of the components and the addition of other components can be made thereto.

The oscillation circuit 80 generates an oscillation signal by using the resonator XTAL. The processing circuit 10 controls the oscillation circuit 80. The storage circuit 25 stores temperature compensation data of an oscillation frequency of the oscillation signal. The processing circuit 10 generates PUF information specific to the circuit device 100 on the basis of the temperature compensation data.

Temperature compensation refers to canceling (reduces) a temperature characteristic (temperature dependency) of the oscillation frequency of the oscillation signal, and controlling the oscillation frequency so that the oscillation frequency becomes constant (substantially constant) with respect to a change in temperature. The temperature compensation data is data which is used for the temperature compensation. For example, the temperature compensation data is control data for controlling switching of a capacitor array provided in the oscillation circuit. Alternatively, the temperature compensation data is data for generating the control data. For example, pieces of control data corresponding to respective temperatures are stored in the storage circuit 25, and the capacitor array is controlled by the control data corresponding to the measured temperature. The control data is temperature compensation data. Alternatively, in a case where a control voltage of VCO is generated by an approximate polynomial expression with a temperature as a variable, coefficient data of the approximate polynomial expression is temperature compensation data. The storage circuit 25 storing the temperature compensation data is, for example, a non-volatile memory (for example, a non-volatile memory 40 of FIG. 2, or the like). Meanwhile, the invention is not limited thereto, and the storage circuit may be a RAM such as an SRAM, a register, a fuse, or the like.

The PUF information specific to the circuit device 100 is specific information corresponding to individual circuit devices. That is, the PUF information is information for identifying the individual of the circuit device or the validity (for example, whether or not the circuit device is a genuine product, or whether or not the circuit device is an assumed product) of the circuit device by the specific information. The PUF information is data (PUF code) which is specific to the circuit device and is acquired using an individual variation having a hardware characteristic. An oscillation characteristic (temperature characteristic) of the resonator XTAL or the oscillation circuit 80 has an individual variation, and thus temperature compensation data for adjusting the individual variation also has an individual variation. For this reason, it is possible to generate PUF information on the basis of the temperature compensation data. The PUF information may be the temperature compensation data itself, or may be data obtained by performing any processing on the temperature compensation data. For example, the PUF information may be data obtained by extracting some data from the temperature compensation data, or may be data obtained by further processing the extracted data. Meanwhile, it is expected that the PUF information is information not overlapped between individuals, but may be allowed to be overlapped in a range for maintaining security.

Various purposes of PUF information can be assumed. For example, the external device 200 may authenticate the circuit device 100 (real-time clocking device) on the basis of the PUF information (or information based on the PUF information), or the circuit device 100 may authenticate the external device 200 on the basis of information received by the circuit device 100 from the external device 200 and the PUF information.

According to this exemplary embodiment, the PUF information uses an individual variation of a hardware characteristic, and thus there is not much possibility that circuit devices having the same PUF information can be reproduced. It is possible to reduce a concern for spoofing of the real-time clocking device due to reproduction or the like or a concern for spoofing of the external device by using such PUF information, and to improve security. In addition, the oscillator performing temperature compensation stores temperature compensation data, and the temperature compensation data has an individual variation. For this reason, it is possible to generate PUF information specific to the circuit device from the temperature compensation data.

In addition, in this exemplary embodiment, an interface circuit 60 outputting authentication information based on the PUF information to the external device 200 is provided.

The authentication information is information for determining whether to allow communication by authenticating a circuit device attempting to perform communication. That is, the authentication information is information for determining whether or not the circuit device attempting to perform communication is valid (for example, whether or not the circuit device is a genuine product or whether or not the circuit device is an assumed product). The authentication information may be the PUF information itself, or may be information generated by performing any processing on the PUF information. For example, data of the authentication information may be data obtained by adding random data (for example, random number data) to the PUF information, or may be data obtained by encoding the data or the PUF information itself.

The external device 200 receives the authentication information, which is output (transmitted) from the interface circuit 60 of the circuit device 100, through the interface circuit 220. The processing circuit 210 performs an authentication process on the basis of the received authentication information, and determines whether to authenticate the circuit device 100 (whether to allow communication with the circuit device 100). For example, the authentication process is performed by comparing the received authentication information with an expected value. The subsequent communication with the circuit device 100 is not allowed in a case where the authentication is not successful, and a normal communication process such as initial setting of the circuit device 100 or data communication with the circuit device 100 is allowed in a case where the authentication is successful.

According to this exemplary embodiment, it is possible to output the authentication information for causing the external device 200 to authenticate the circuit device 100 from the circuit device 100 to the external device 200. Thereby, it is possible to reduce a concern for spoofing of the circuit device 100 (real-time clocking device including the circuit device 100). That is, the external device 200 can determine whether the circuit device 100 having transmitted the authentication information (that is, connected to the external device 200) is a device to communicate with the external device, on the basis of the authentication information. Thereby, in a case where fraudulence, such as replacement of the real-time clocking device mounted on the substrate with a fraudulent device, occurs, it is possible to detect the occurrence of the fraudulence and to improve security.

In addition, in this exemplary embodiment, the circuit device 100 may include an encoding processing circuit (encoding processing circuit) that performs an encoding process based on PUF information.

Specifically, the encoding processing circuit (for example, an encoding processing circuit 14 of FIGS. 4 and 5) encodes authentication information based on the PUF information, and the interface circuit 60 transmits the authentication information encoded by the encoding processing circuit to the external device 200. Alternatively, the interface circuit 60 receives information based on the PUF information from the external device 200, and the encoding processing circuit performs a decoding process based on the received information. For example, in FIG. 6, the interface circuit 60 receives the encoded PUF information from the external device 200, and the encoding processing circuit 14 decodes the encoded PUF information.

As the encoding process (encoding, decoding), a common key encoding system such as Advanced Encryption Standard (AES) or a public key encoding system such as RSA can be used. Meanwhile, the encoding processing circuit may be included in the processing circuit 10 as illustrated in, for example, FIG. 4 and the like, or may be provided as a circuit separate from the processing circuit 10.

In this manner, it is possible to reduce a possibility of security being broken and to improve the security of the system, as compared to a case where data not encoded (for example, plain text data) is transmitted from the circuit device to the external device or from the external device to the circuit device.

In addition, in this exemplary embodiment, the interface circuit 60 may receive external device authentication information for authenticating the external device 200. The processing circuit 10 may perform an authentication process on the external device 200 on the basis of the external device authentication information and PUF information.

Figure 6:
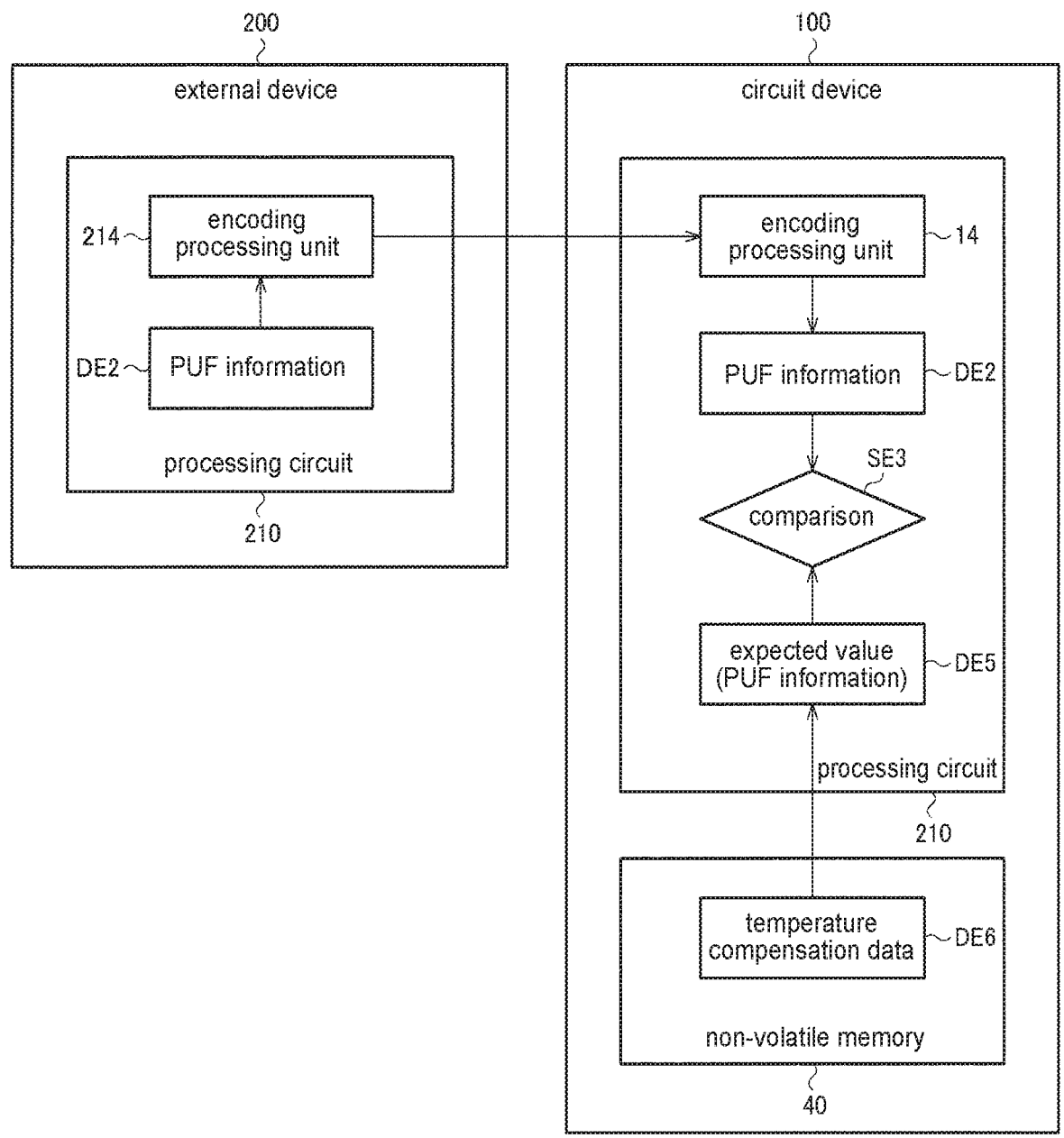
FIG. 6 illustrates a fifth detailed configuration example of the circuit device according to this exemplary embodiment and the system including the circuit device.

For example, in FIG. 6, the interface circuit 60 receives PUF information from the external device 200 as the external device authentication information, and the processing circuit 10 performs authentication by comparing the PUF information and the PUF information (expected value) generated by the circuit device 100 and determining whether or not the pieces of PUF information are consistent with each other. For example, the PUF information generated by the circuit device 100 is stored in the external device 200 in advance, and the PUF information is transmitted to the circuit device 100 as external device authentication information. The circuit device 100 allows communication with the external device 200 in a case where the transmitted PUF information is consistent with its own PUF information.

According to this exemplary embodiment, the circuit device 100 can receive external device authentication information for causing the circuit device 100 to authenticate the external device 200, from the external device 200. Thereby, it is possible to reduce a concern for spoofing of the external device 200. That is, the circuit device 100 can determine whether or not the external device 200 having transmitted the external device authentication information (that is, connected to the circuit device 100) is a device to communicate, on the basis of the external device authentication information. Thereby, for example, it is possible to reduce a concern for fraudulence such as replacement of the external device 200 mounted on the substrate with a fraudulent device or communication with the circuit device 100 from a device disguised from the external device 200, and accordingly, it is possible to improve security.

In addition, in this exemplary embodiment, the processing circuit 10 extracts data of a predetermined number of bits from temperature compensation data to generate PUF information.

That is, the processing circuit 10 generates the PUF information on the basis of a portion of the entire temperature compensation data. The processing circuit 10 extracts a necessary number of bits (a predetermined number of bits) from a predetermined position (address) of the temperature compensation data as the PUF information, and couples the extracted bits to each other to generate PUF information of the predetermined number of bits.

The number of bits of the temperature compensation data may be larger than the number of bits which is necessary for the maintenance of uniqueness (not (substantially not) overlapped between individuals) as PUF information. According to this exemplary embodiment, it is possible to generate PUF information of a small number of bits from the temperature compensation data while maintaining uniqueness by extracting data of a predetermined number of bits from the temperature compensation data.

In addition, in this exemplary embodiment, the oscillation circuit 80 includes a variable capacitance circuit (for example, a variable capacitance circuit 82 of FIG. 7) for temperature compensation. The temperature compensation data is adjustment data for adjusting a capacitance value of the variable capacitance circuit.

For example, the variable capacitance circuit is a capacitor array, and data for adjusting a capacitance value by controlling the turn-on or turn-off of a switch of the capacitor array is temperature compensation data. Alternatively, the variable capacitance circuit is a variable capacitor in which a capacitance value is controlled by a D/A conversion circuit and an output voltage of the D/A conversion circuit, and data which is input to the D/A conversion circuit is temperature compensation data.

In this manner, the oscillation circuit 80 includes the variable capacitance circuit for temperature compensation in which a capacitance value is adjusted by temperature compensation data, and thus can perform temperature compensation. The temperature compensation data varies depending on an individual variation of the oscillation circuit 80 including the variable capacitance circuit or the resonator XTAL, and thus it is possible to generate PUF information on the basis of the temperature compensation data.

In addition, in this exemplary embodiment, the temperature compensation data is data in which pieces of adjustment data (for example, DATA0 to DATA127 of FIG. 8) are stored in a plurality of respective addresses corresponding to a plurality of temperatures. The processing circuit 10 generates PUF information by using pieces of adjustment data of at least two addresses of the plurality of addresses.

That is, one address corresponds to each temperature in a temperature range for performing temperature compensation, and adjustment data on the corresponding temperature is stored in the address. Adjustment data of an address corresponding to a temperature measured by a temperature sensor is read out, and a capacitance value of the variable capacitance circuit is adjusted, thereby performing temperature compensation.

In this exemplary embodiment, PUF information is generated from pieces of adjustment data of at least two addresses (two temperatures) in the temperature compensation data. The temperature compensation data has an individual variation, but there is a possibility that pieces of PUF information are consistent with each other between individuals in adjustment data of one address (one temperature). For this reason, it is possible to reduce a possibility that pieces of PUF information are consistent with each other between individuals by using pieces of adjustment data of at least two addresses (two temperatures) (it is possible to improve the uniqueness of the PUF information).

In addition, in this exemplary embodiment, at least two addresses are at least two addresses among an address on a low temperature side among the plurality of addresses, an address on a high temperature side, and an address between the address on the low temperature side and the address on the high temperature side.

The address on the low temperature side is an address corresponding to a temperature on the low temperature side in a temperature range for performing temperature compensation. Specifically, the address on the low temperature side is an address corresponding to a lower limit in the temperature range, or is a plurality of addresses (for example, two to five addresses) which correspond to temperatures in the vicinity of the lower limit. The address on the high temperature side is an address corresponding to a temperature on the high temperature side in the temperature range for performing temperature compensation. Specifically, the address on the high temperature side is an address corresponding to an upper limit in the temperature range, or is a plurality of addresses (for example, two to five addresses) which correspond to temperatures in the vicinity of the upper limit. The address between the address on the low temperature side and the address on the high temperature side is an address corresponding to a temperature between a temperature on the low temperature side and a temperature on the high temperature side. For example, the address between the address on the low temperature side and the address on the high temperature side is an address corresponding to a temperature which is half of the temperature range for performing temperature compensation, or is a plurality of address (for example, two to five addresses) which correspond to temperatures in the vicinity of the temperature which is half of the temperature range.

As described later in FIGS. 9 and 10, temperature compensation data has a variation due to individual variations of various parameters related to temperature compensation. Among these, it is assumed that a variation easily occurs in adjustment data on the address on the low temperature side, the address on the high temperature side, and the address between the address on the low temperature side and the address on the high temperature side. According to this exemplary embodiment, PUF information is generated using adjustment data on at least two addresses among these addresses, and thus it can be expected that the uniqueness of the PUF information is improved.

In addition, in this exemplary embodiment, the clocking unit 30 generates clocking data which is real-time clock information on the basis of an oscillation signal. The interface circuit 60 outputs the clocking data to the external device 200.

The external device 200 receives the clocking data through the interface circuit 220, and the processing circuit 210 performs processing based on the received clocking data. For example, the processing circuit 210 reads out the clocking data from the circuit device 100 (real-time clocking device) when a main power supply of the system is turned on, and initializes a time of the system.

The clocking data is data indicating a time as real-time clock information. That is, the clocking data is data on a time measured by the clocking unit 30 as the real-time clock information. For example, the clocking data is data indicating a date and time, and may include calendar data and time data. For example, the calendar data is data such as year, month, week, and day, and the time data is data such as hour, minute, and second. For example, the clocking unit 30 performs frequency division of the oscillation signal to generate clock signals in cycles of one second, and measures a time by counting the clock signals.

The real-time clocking device is a device which is operated by a backup power supply, such as a battery, and continuously performs clocking (measuring of a real time) even when a main power supply of a system is turned off. When the main power supply is turned on, the external device 200 initializes the time of the system with reference to the clocking data of the real-time clocking device. For example, in a case where the external device 200 performs data authentication by using an electronic signature, the external device 200 compares a time when the electronic signature attached to data transmitted through a network or the like is issued with the time of the system to verify the electronic signature. At this time, the time of the system is required to be set to be a correct time, but the time of the system is set to be an incorrect time due to spoofing of the real-time clocking device, which results in a concern that the electronic signature cannot be correctly verified.

In this regard, according to this exemplary embodiment, authentication information for causing the external device 200 to authenticate the real-time clocking device (circuit device 100) can be output from the circuit device 100 to the external device 200, and thus it is possible to reduce a concern for spoofing of the real-time clocking device. Thereby, it is possible to improve the security of the system including the real-time clocking device.

Figure 13:
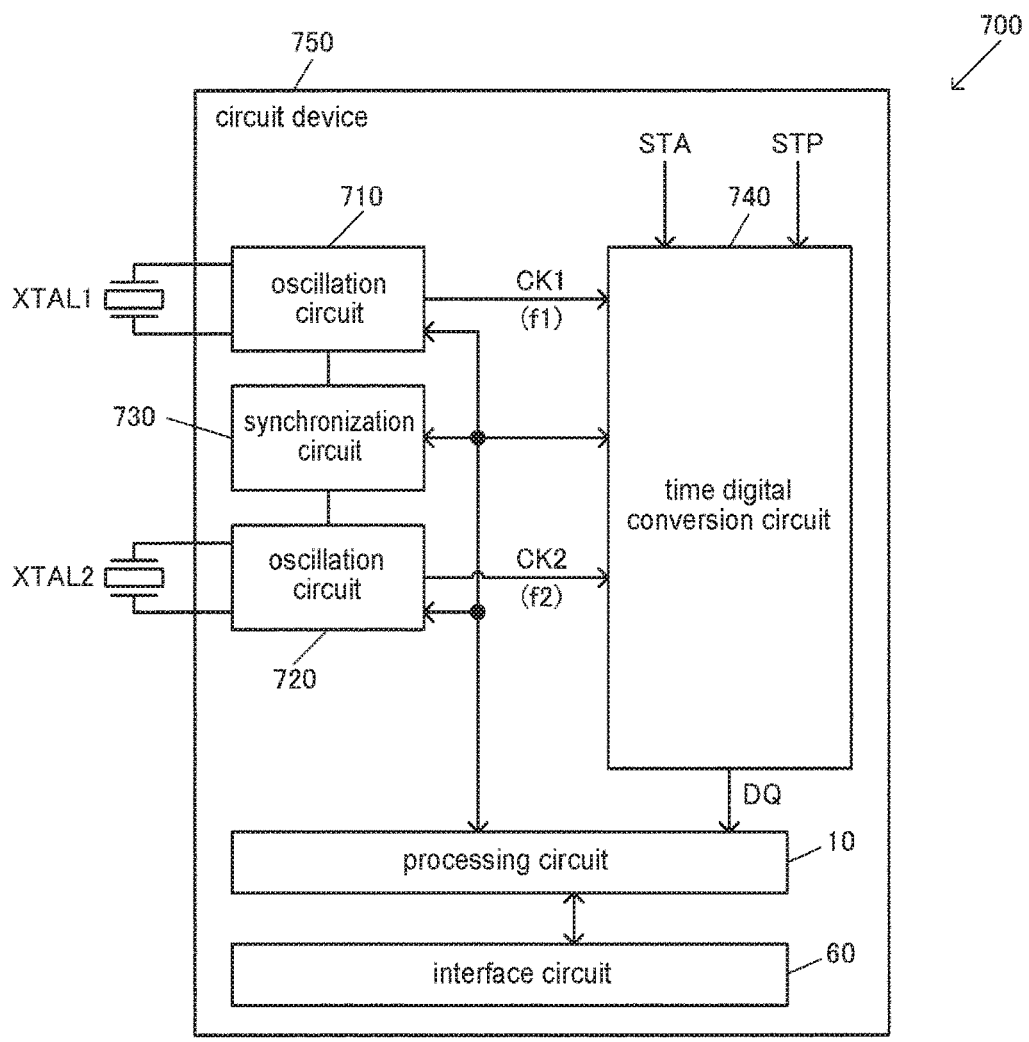
FIG. 13 illustrates a configuration example of a physical quantity measurement device.

Meanwhile, in the above, an example of a case where the method of the invention is applied to the real-time clocking device has been described, but the method of the invention may be applied to a physical quantity measurement device. FIG. 13 illustrates a time-to-digital converter as an example of the physical quantity measurement device. Here, an outline thereof will be described, and details thereof will be described later.

In the exemplary embodiment illustrated in FIG. 13, a circuit device 750 includes a time-to-digital conversion circuit 740 that performs time-to-digital conversion on the basis of an oscillation signal. The interface circuit 60 outputs information (for example, a digital value DQ of a time) which is generated on the basis of time-to-digital conversion to the external device 200.

The time-to-digital converter is used for, for example, a distance measurement sensor of a Time Of Flight (TOF) system, and the distance measurement sensor is used to detect, for example, a distance between an on-vehicle device and an object in the vicinity of an automobile. For example, such a distance measurement technique is used to realize driver assist and automatic driving.

Such a time-to-digital converter (physical quantity measurement device) is one of devices that communicate with an external device (for example, SOC), similar to the real-time clocking device. That is, there is a concern for spoofing (for example, use of a non-genuine product), similar to the real-time clocking device. According to this exemplary embodiment, since the circuit device 750 (interface circuit 60) outputs authentication information to the external device 200, the external device 200 can authenticate the time-to-digital converter, and it is possible to reduce a concern for spoofing of the time-to-digital converter. Thereby, for example, an on-vehicle device can perform distance measurement on the basis of an output of a valid time-to-digital converter.

2. Detailed Configuration Example of Circuit Device and System

Figure 2:
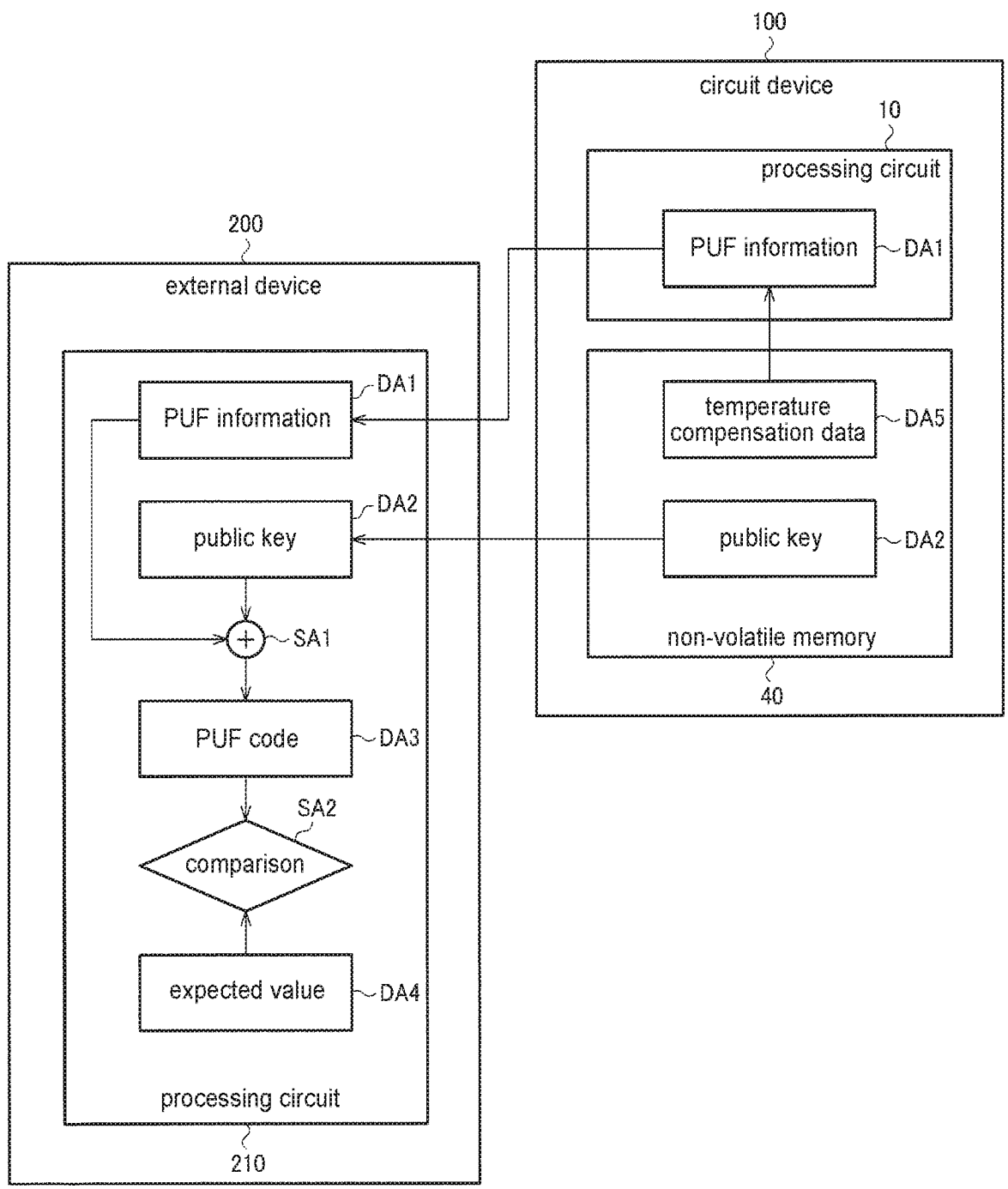
FIG. 2 illustrates a first detailed configuration example of the circuit device according to this exemplary embodiment and a system including the circuit device.

FIG. 2 illustrates a first detailed configuration example of the circuit device 100 according to this exemplary embodiment and the system including the circuit device 100. Meanwhile, FIG. 2 schematically illustrates a configuration and operations (processes). In addition, the interface circuit 60, the oscillation circuit 80, and the clocking unit 30 are not shown in the drawing.

In the first detailed configuration example, the circuit device 100 transmits PUF information DA1 to the external device 200 as authentication information. That is, the processing circuit 10 reads out temperature compensation data DA5 from the non-volatile memory 40, generates the PUF information DA1 on the basis of the read-out temperature compensation data DA5, and transmits the PUF information DA1 to the external device 200.

In addition, the circuit device 100 transmits a public key DA2 stored in the non-volatile memory 40 to the external device 200. The public key DA2 is written in the non-volatile memory 40, for example, during the manufacture of the system (during the manufacture of an electronic apparatus in which an oscillator or a physical quantity measurement device is embedded, or the like).

The processing circuit 210 of the external device 200 performs a computational calculation process SA1 (for example, a decoding process) on the basis of the received PUF information DA1 and the public key DA2 to generate a PUF code DA3. For example, the public key DA2 is key data which is generated in advance so as to be capable of decoding an expected value DA4 stored in the external device 200 from the PUF information DA1 specific to the circuit device 100. A process (computational calculation process SA1) of decoding to the PUF information DA1 is performed using the public key DA2 to generate a PUF code DA3.

The processing circuit 210 performs a process SA2 of comparing the generated PUF code DA3 with the expected value DA4, and performs an authentication process on the basis of a comparison result. That is, it is determined that authentication is established in a case where the PUF code DA3 and the expected value DA4 are consistent with each other, and it is determined that authentication is not established in a case where the PUF code DA3 and the expected value DA4 are not consistent with each other.

Figure 3:
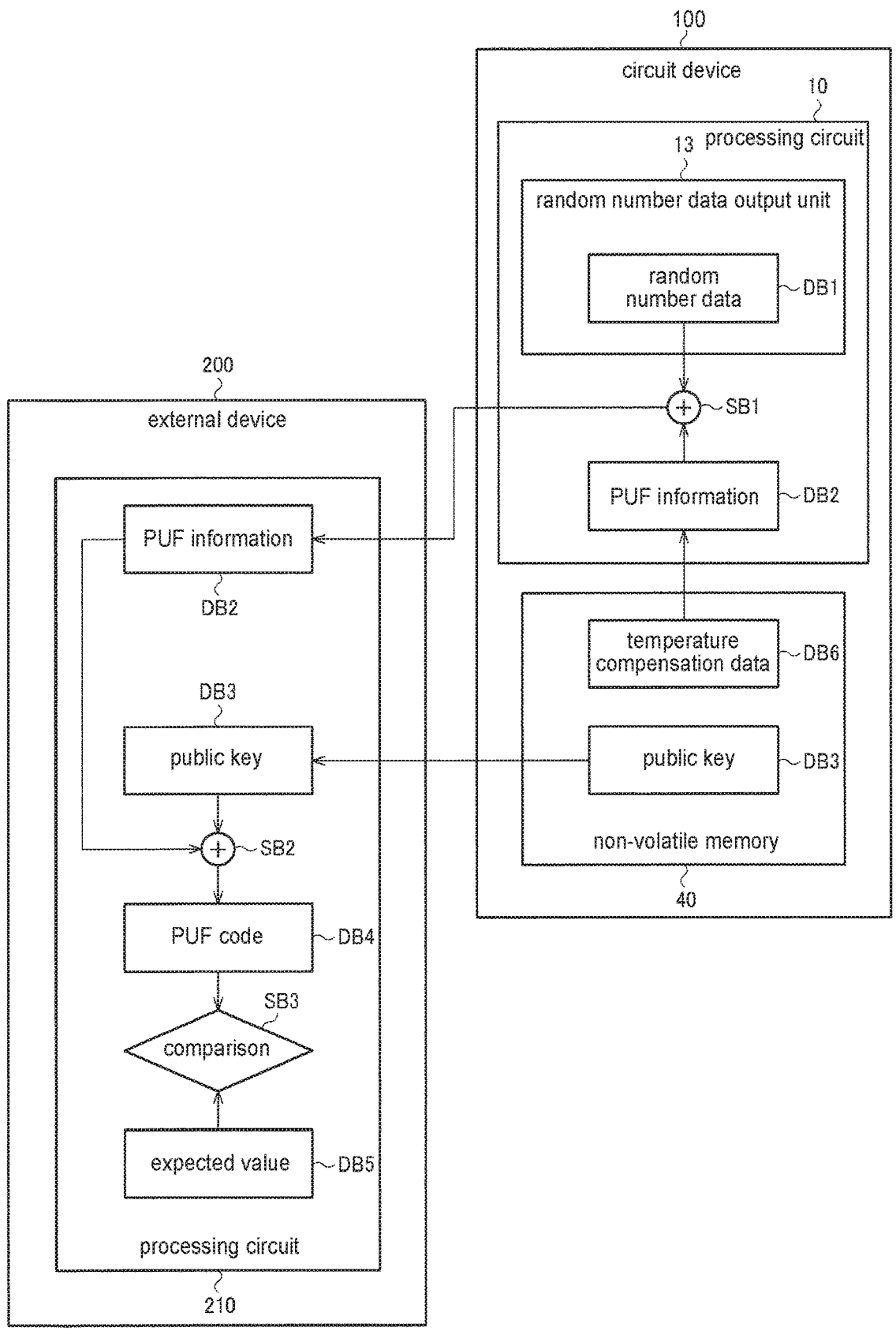
FIG. 3 illustrates a second detailed configuration example of the circuit device according to this exemplary embodiment and the system including the circuit device.

FIG. 3 illustrates a second detailed configuration example of the circuit device 100 according to this exemplary embodiment and the system including the circuit device 100. Meanwhile, FIG. 3 schematically illustrates a configuration and operations (processes). In addition, the interface circuit 60, the oscillation circuit 80, and the clocking unit 30 are not shown in the drawing. In addition, a description of the same operation as that in the first detailed configuration example will be appropriately omitted.

In the second detailed configuration example, the processing circuit 10 of the circuit device 100 performs a process SB1 of generating PUF information DB2 on the basis of temperature compensation data DB6 which is read out from the non-volatile memory 40 and generating authentication information by combining the PUF information DB2 and random number data DB1 which is output from the random number data output unit 13 with each other, and transmits the authentication information to the external device 200. In addition, the circuit device 100 transmits a public key DB3 stored in the non-volatile memory 40 to the external device 200.

The processing circuit 210 of the external device 200 extracts the PUF information DB2 from the received authentication information. The processing circuit 210 performs a computational calculation process SB2 (for example, a decoding process) on the basis of the extracted PUF information DB2 and the received public key DB3 to generate a PUF code DB4. The processing circuit 210 performs a process SB3 of comparing the generated PUF code DB4 with an expected value DB5, and performs an authentication process on the basis of a comparison result.

Figure 4:
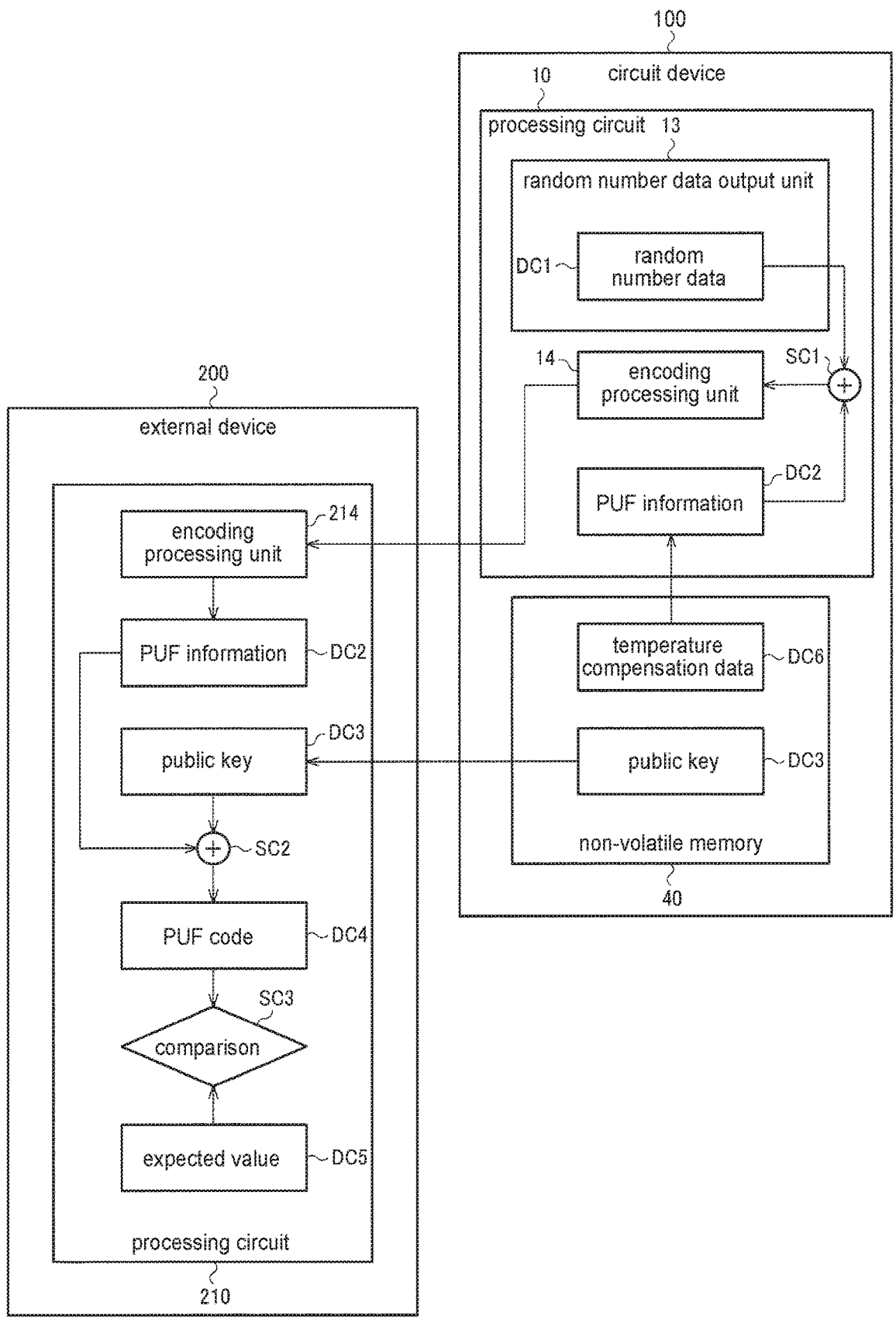
FIG. 4 illustrates a third detailed configuration example of the circuit device according to this exemplary embodiment and the system including the circuit device.

FIG. 4 illustrates a third detailed configuration example of the circuit device 100 according to this exemplary embodiment and the system including the circuit device 100. Meanwhile, FIG. 4 schematically illustrates a configuration and operations (processes). In addition, the interface circuit 60, the oscillation circuit 80, and the clocking unit 30 are not shown in the drawing. In addition, a description of the same operation as those in the first and second detailed configuration examples will be appropriately omitted.

In the third detailed configuration example, the processing circuit 10 of the circuit device 100 performs a process SC1 of reading out temperature compensation data DC6 from the non-volatile memory 40 to generate PUF information DC2, and combining the PUF information DC2 and random number data DC1 which is output from the random number data output unit 13 with each other. The encoding processing circuit 14 encodes output data of the process SC1, and the processing circuit 10 transmits the encoded data to the external device 200 as authentication information. For example, the encoding processing circuit 14 performs encoding according to an AES system by using a common key which is common to the external device 200. In addition, the circuit device 100 transmits a public key DC3 stored in the non-volatile memory 40 to the external device 200.

An encoding processing circuit 214 of the external device 200 decodes the PUF information DC2 from the received authentication information. For example, the encoding processing circuit 214 performs decoding according to an AES system by using a common key which is common to the circuit device 100. The processing circuit 210 performs a computational calculation process SC2 (for example, a decoding process) on the basis of the decoded PUF information DC2 and the received public key DC3 to generate a PUF code DC4. The processing circuit 210 performs a process SC3 of comparing the generated PUF code DC4 with an expected value DC5, and performs an authentication process on the basis of a comparison result.

Figure 5:
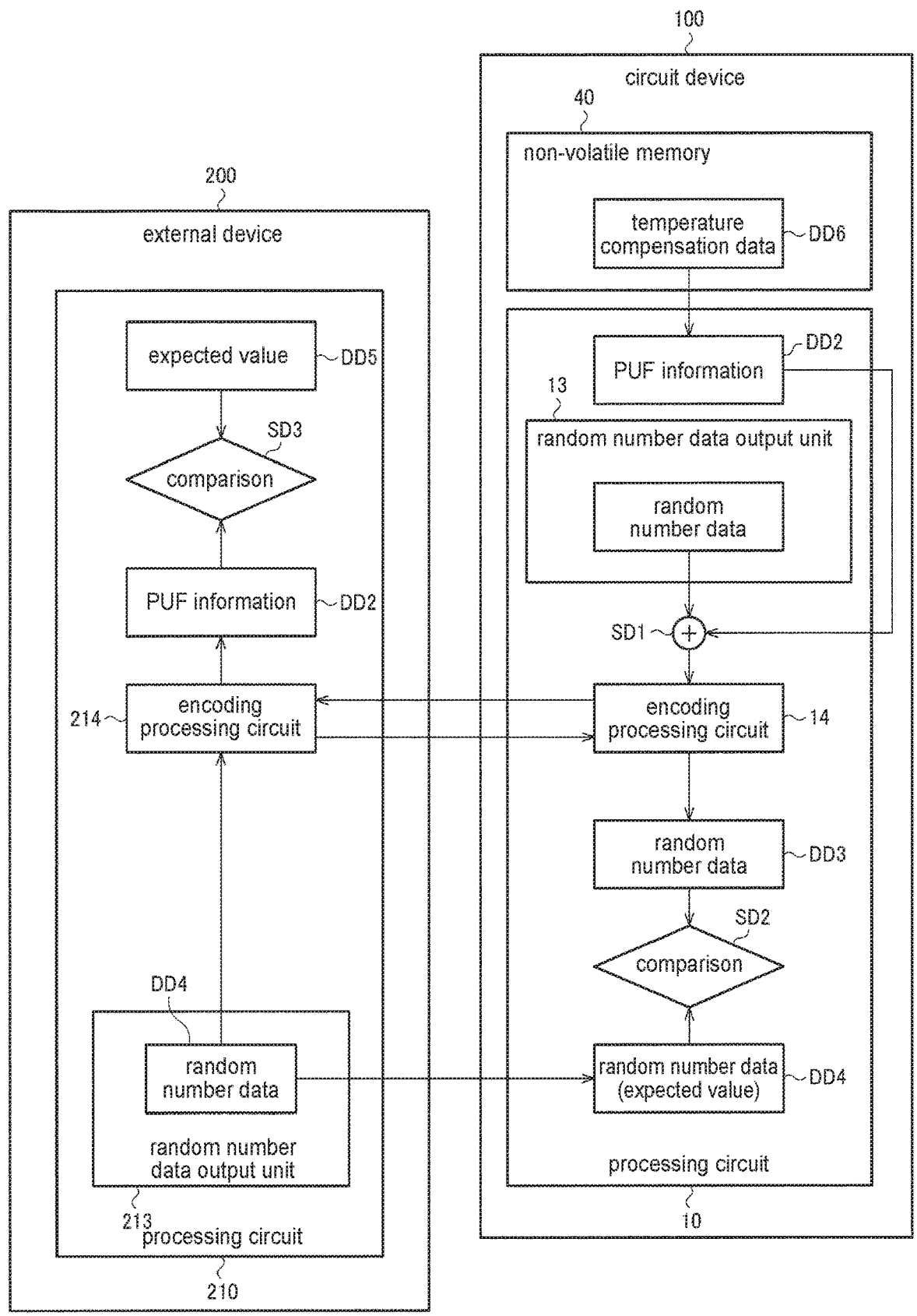
FIG. 5 illustrates a fourth detailed configuration example of the circuit device according to this exemplary embodiment and the system including the circuit device.

FIG. 5 illustrates a fourth detailed configuration example of the circuit device 100 according to this exemplary embodiment and the system including the circuit device 100. Meanwhile, FIG. 5 schematically illustrates a configuration and operations (processes). In addition, the interface circuit 60, the oscillation circuit 80, and the clocking unit 30 are not shown in the drawing. In addition, a description of the same operation as those in the first to third detailed configuration examples will be appropriately omitted.

In the fourth detailed configuration example, a first authentication process in which the external device 200 authenticates the circuit device 100 and a second authentication process in which the circuit device 100 authenticates the external device 200 are performed.

In the first authentication process, the processing circuit 10 of the circuit device 100 performs a process SD1 of combining PUF information DD2 generated from temperature compensation data DD6 with random number data DD1, the encoding processing circuit 14 encodes output data of the process SD1, and the processing circuit 10 transmits the encoded data to the external device 200 as authentication information. The encoding processing circuit 214 of the external device 200 performs a process SD3 of decoding the PUF information DD2 from the received authentication information and comparing the decoded PUF information DD2 with an expected value DD5, and performs an authentication process on the basis of a comparison result.

In the second authentication process, the random number data output unit 213 of the external device 200 outputs random number data DD4, and the encoding processing circuit 214 encodes the random number data DD4. The processing circuit 210 transmits data (external device authentication information) which is obtained by encoding the random number data DD4 and the random number data DD4 which is a plain text to the circuit device 100. The encoding processing circuit 14 of the circuit device 100 decodes the received encoded data to generate random number data DD3. The processing circuit 10 performs a process SD2 of comparing the decoded random number data DD3 with the received random number data DD4 (expected value) which is a plain text, and performs an authentication process on the basis of a comparison result.

FIG. 6 illustrates a fifth detailed configuration example of the circuit device 100 according to this exemplary embodiment and the system including the circuit device 100. Meanwhile, FIG. 6 schematically illustrates a configuration and operations (processes). In addition, the interface circuit 60, the oscillation circuit 80, and the clocking unit 30 are not shown in the drawing. In addition, a description of the same operation as those in the first to fourth detailed configuration examples will be appropriately omitted.

In the fifth detailed configuration example, the circuit device 100 performs an authentication process on the basis of external device authentication information and PUF information. Specifically, the encoding processing circuit 214 of the external device 200 encodes PUF information DE2, and the processing circuit 210 transmits the encoded PUF information DE2 to the circuit device 100 as external device authentication information. The encoding processing circuit 14 of the circuit device 100 decodes the PUF information DE2 from the received external device authentication information. The processing circuit 10 performs a process SE3 of comparing the PUF information DE2 with an expected value DE5, and performs an authentication process on the basis of a comparison result. For example, the processing circuit 10 of the circuit device 100 generates the expected value DE5 on the basis of temperature compensation data DE6 which is read out from the non-volatile memory 40. The PUF information DE2 and the expected value DE5 are PUF information which is specific to the circuit device 100. That is, the external device 200 and the circuit device 100 share the same PUF information in advance, and authentication is performed by determining consistency therebetween.

Meanwhile, a method of causing the circuit device 100 to authenticate the external device 200 is not limited thereto. For example, the method of causing the external device 200 to authenticate the circuit device 100 which is described in the first to fourth detailed configuration examples is reversely applied to be used as a method of causing the circuit device 100 to authenticate the external device 200.

3. Method of Generating Authentication Information

A description will be given of a detailed example of a method of generating authentication information from specific information in a case where temperature compensation data is used as the specific information.

Figure 7:
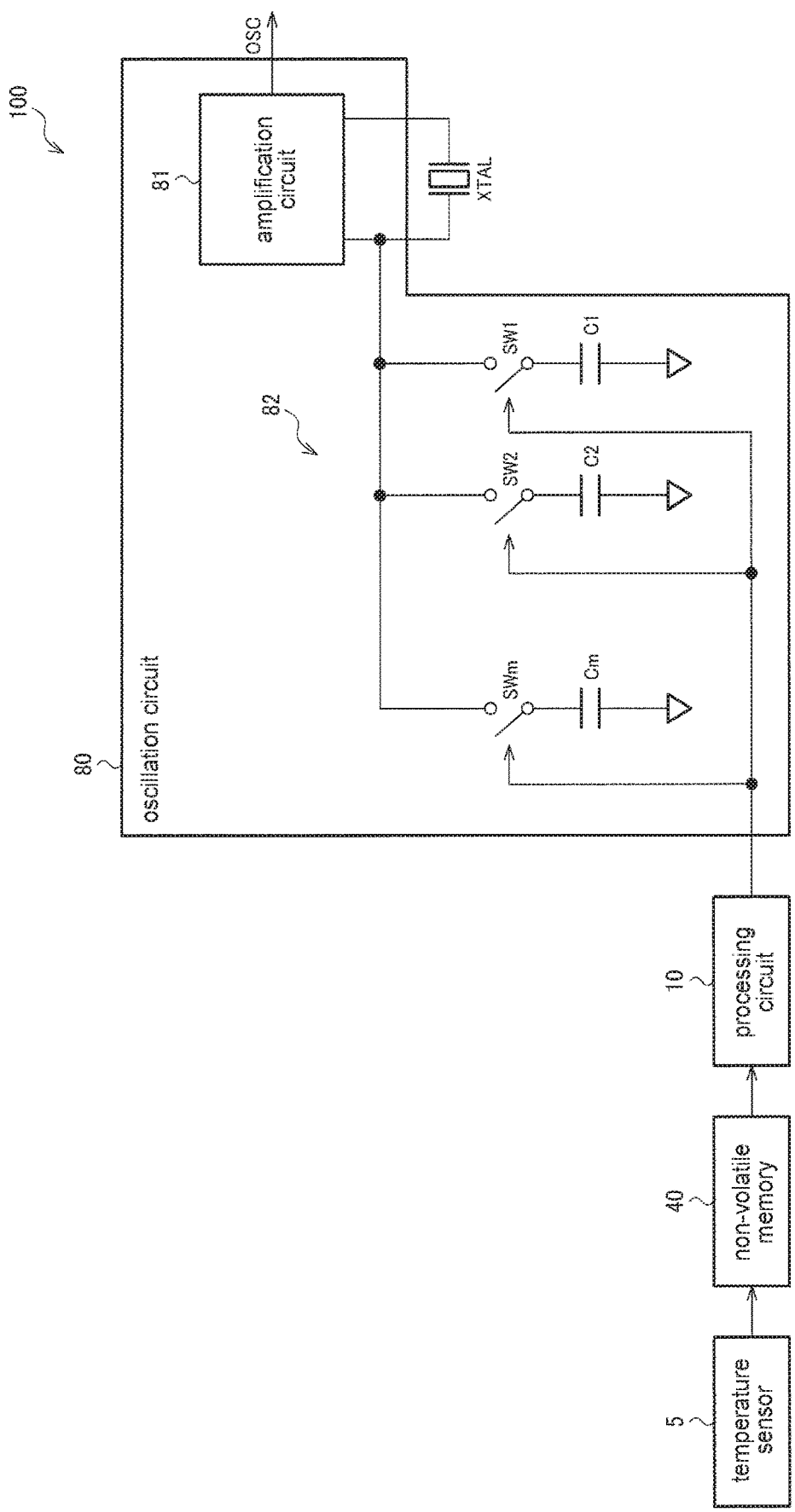
FIG. 7 illustrates a second configuration example of the circuit device according to this exemplary embodiment and a detailed configuration example of an oscillation circuit.

FIG. 7 illustrates a second configuration example of the circuit device 100 according to this exemplary embodiment and a detailed configuration example of the oscillation circuit. The circuit device 100 includes a temperature sensor 5, the non-volatile memory 40, the processing circuit 10, and the oscillation circuit 80. Meanwhile, in FIG. 7, the interface circuit 60 and the clocking unit 30 are not shown.

The oscillation circuit 80 includes an amplification circuit 81 that drives (oscillates) the resonator XTAL to generate an oscillation signal OSC, and the variable capacitance circuit 82 that adjusts an oscillation frequency of the oscillation signal. The amplification circuit 81 includes a first node which is connected to one end of the resonator XTAL, and a second node which is connected to the other end of the resonator XTAL. The variable capacitance circuit 82 is provided in the first node (or the second node) of the amplification circuit 81, and is constituted by a capacitor array. Specifically, the variable capacitance circuit 82 includes switching elements SW1 to SWm each of which one end is connected to the first node, and capacitors C1 to Cm each of which one end is connected to the other end of each of the switching elements SW1 to SWm. Here, m is an integer of 2 or greater. The other end of each of the capacitors C1 to Cm is connected to a node of a reference voltage (for example, a power supply voltage on a low potential side). A capacitance value of each of the capacitors C1 to Cm is weighted by, for example, a binary (a power of 2). Each of the switching elements SW1 to SWm is constituted by, for example, a transistor.

The temperature sensor 5 is a sensor that detects the temperature (environment temperature; the temperature of the substrate of the circuit device 100) of the circuit device 100. Specifically, the temperature sensor 5 includes a sensor circuit that outputs a temperature detection signal, and an A/D conversion circuit that performs A/D conversion on the temperature detection signal and outputs temperature detection data. The sensor circuit is a circuit that generates a temperature detection signal on the basis of, for example, temperature dependency of a forward voltage of a PN junction.

The non-volatile memory 40 stores temperature compensation data corresponding to temperatures in a temperature range for performing temperature compensation. The non-volatile memory 40 outputs the temperature compensation data on the temperatures corresponding to the temperature detection data.

FIG. 8 illustrates an example of temperature compensation data stored in the non-volatile memory 40. Pieces of temperature compensation data DATA0 to DATA127 (adjustment data) are stored in storage regions of an address 0 to an address 127 of the non-volatile memory 40. One address corresponds to one temperature in the temperature range. For example, the address 0 to the address 127 correspond to temperatures at 128 points obtained by the temperature range into 128 equal parts. The pieces of temperature compensation data DATA0 to DATA127 are data constituted by first to m-th bits D1 to Dm.

The processing circuit 10 decodes the temperature detection data to the address of the non-volatile memory 40, and reads out the temperature compensation data of the address from the non-volatile memory 40. The processing circuit 10 outputs control signals corresponding to the bits D1, D2, . . . , and Dm of the temperature compensation data to the switching elements SW1, SW2, . . . , and SWm of the variable capacitance circuit 82. For example, a switching element SWi is turned on when a bit Di=1, and the switching element SWi is turned off when the bit Di=0. Here, i is an integer of equal to or greater than 1 and equal to or less than m.

In this manner, temperature compensation data based on a detected temperature is selected from the pieces of temperature compensation data DATA0 to DATA127, and connection and non-connection of the capacitors C1 to Cm are selected on the basis of the temperature compensation data, so that temperature compensation of an oscillation frequency of the oscillation signal OSC is performed. The pieces of temperature compensation data DATA0 to DATA127 are data measured during the manufacture of an oscillator or a physical quantity measurement device so that the oscillation frequency of the oscillation signal OSC becomes constant (including becoming substantially constant) regardless of a temperature.

Figure 9:
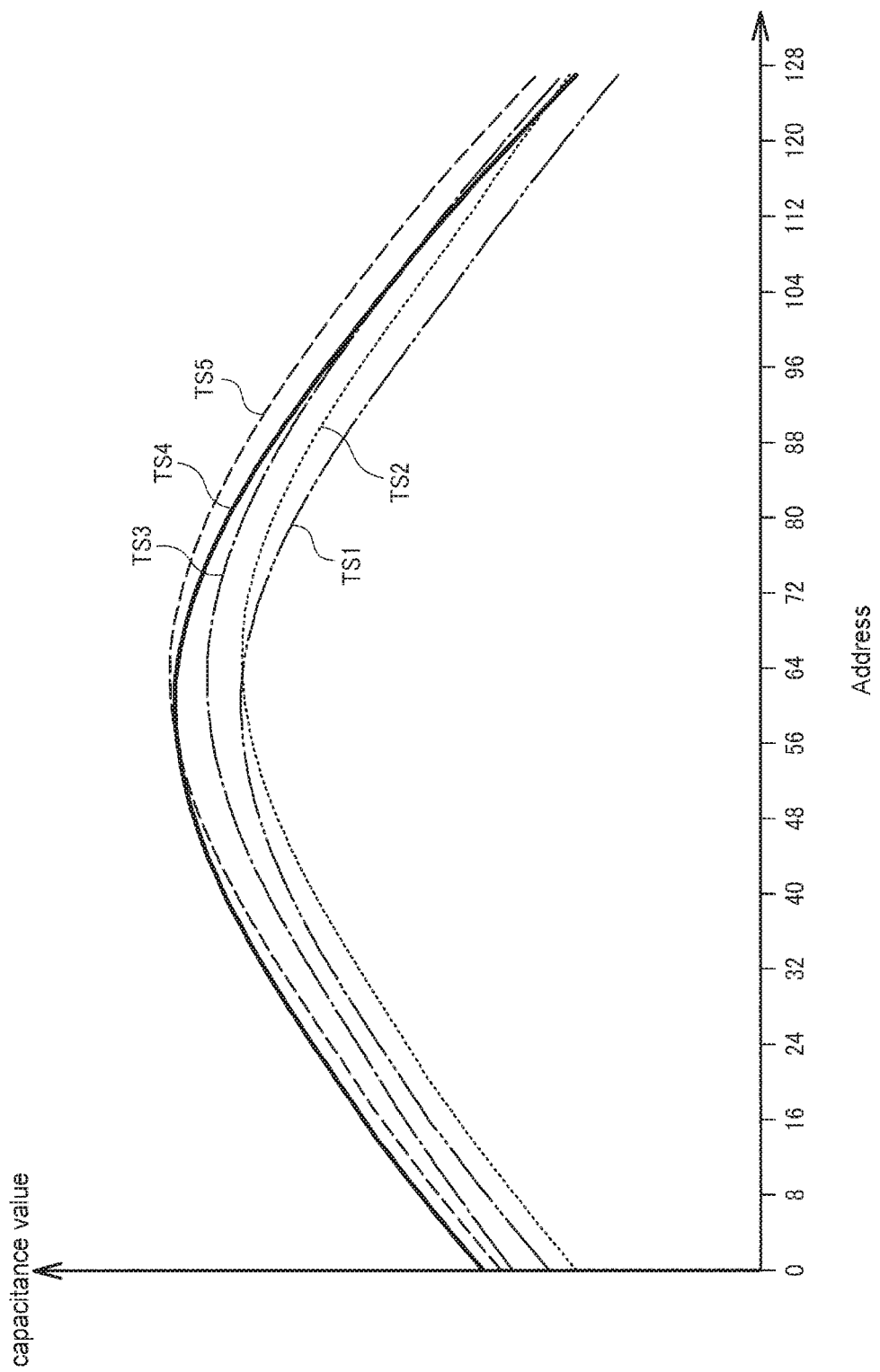
FIG. 9 illustrates an example of characteristics of capacitance values of an adjustment circuit with respect to temperatures.

FIG. 9 illustrates an example of characteristics of capacitance values of the variable capacitance circuit 82 with respect to temperatures. In FIG. 9, the horizontal axis represents an address corresponding to a temperature.

A temperature characteristic of an oscillation frequency of the resonator XTAL has a characteristic of a secondary function (substantially the secondary function) with respect to a temperature. In response to this, a characteristic of a capacitance value also serves as a characteristic of the secondary function (substantially the secondary function). In FIG. 9, characteristics TS1 to TS5 of capacitance values in five samples (oscillators) are shown as examples. As seen from the characteristics TS1 to TS5, a characteristic of a capacitance value is different for each sample. For example, the maximum value of the secondary function, an address in which the secondary function has the maximum value, and a coefficient (for example, a coefficient of a second order is related to the degree of opening of a parabola) of each order of the secondary function are different.

In this exemplary embodiment, pieces of temperature compensation data of some (one or plural) addresses among the pieces of temperature compensation data DATA0 to DATA127 of the addresses 0 to 127 are readout from the non-volatile memory 40, and specific information is generated on the basis of the temperature compensation data of the plurality of addresses. For example, in a case where temperature compensation data of one address is data of 10 bits (m=10) and specific information of 100 bits is generated, pieces of temperature compensation data is read out from ten addresses, and the ten pieces of temperature compensation data are combined with each other to be set as specific information. For example, the ten pieces of temperature compensation data by 10 bits are arranged in order from an LSB side of the specific information to be set as data of 100 bits.

FIG. 10 illustrates an example of the selection of an address when specific information is generated. Example 1 to Example 6 indicate address regions in which a variation (difference in capacitance value) of a characteristic of a capacitance value easily occurs when various parameters are changed. In this exemplary embodiment, temperature compensation data is selected from the address region in which such a difference easily occurs, thereby generating specific information. Hereinafter, a description will be given of an example of a case where the address 0 corresponds to the lowest temperature in the temperature range and the address 127 corresponds to the highest temperature in the temperature range.

As shown in Example 1, in a case where a secondary coefficient of a temperature characteristic of an oscillation frequency of the resonator is changed as a parameter and (it is supposed that) the other parameters are fixed, it is assumed that variations in temperature compensation data of an address on the low temperature side and an address on the high temperature side are increased.

The address on the low temperature side is an address corresponding to a temperature on the low temperature side among the addresses 0 to 127. Specifically, the address on the low temperature side is the address 0 or a plurality of addresses (for example, two to five addresses) in the vicinity of the address 0. The address on the high temperature side is an address corresponding to a temperature on the high temperature side among the addresses 0 to 127. Specifically, the address on the high temperature side is the address 127 or a plurality of addresses (for example, two to five addresses) in the vicinity of the address 127.

As shown in Example 2, in a case where a peak temperature (a temperature for obtaining a maximum value) of a temperature characteristic of an oscillation frequency of the resonator is changed as a parameter and (it is supposed that) the other parameters are fixed, it is assumed that variations in temperature compensation data of an address on the low temperature side and an address on the high temperature side are increased.

As shown in Example 3, in a case where an oscillation frequency of the resonator at 25° C. (a so-called room temperature) is changed as a parameter and (it is supposed that) the other parameters are fixed, it is assumed that variations in temperature compensation data of a middle temperature address are increased.

The middle temperature address is an address between an address on the low temperature side and an address on the high temperature side among the addresses 0 to 127. Specifically, middle temperature address is the address 63 or a plurality of addresses in the vicinity of the address 63 (for example, two to five addresses).

As shown in Example 4, in a case where a pace characteristic of a capacitance value of an adjustment circuit that adjusts an oscillation frequency of the resonator is changed as a parameter and (it is supposed that) the other parameters are fixed, it is assumed that variations in temperature compensation data of an address on the low temperature side and an address on the high temperature side are increased. The pace characteristic is a characteristic of an oscillation frequency with respect to the capacitance value of the adjustment circuit, and an inclination of the characteristic represents a change (sensitivity) in the oscillation frequency with respect to a change in the capacitance value.

As shown in Example 5, in a case where the accuracy of A/D conversion of an A/D conversion circuit that performs A/D conversion of a temperature detection signal is changed as a parameter and (it is supposed that) the other parameters are fixed, it is assumed that variations in temperature compensation data of an address on the low temperature side and an address on the high temperature side are increased.

As shown in Example 6, in a case where variations in capacitance value of the capacitors C1 to Cm of the adjustment circuit are changed as parameters and (it is supposed that) the other parameters are fixed, it is assumed that variations in temperature compensation data of an address on the low temperature side and an address on the high temperature side are increased.

From the above-described Example 1 to Example 6, in this exemplary embodiment, temperature compensation data of an address on the low temperature side, an address on the high temperature side, and an address therebetween (middle temperature address) is used as specific information. For example, one or preferably two or more of the address on the low temperature side, the address on the high temperature side, and the address therebetween are used. It can be expected that the uniqueness of specific information is increased (the rate of overlap is decreased) when temperature compensation data is selected from a plurality of temperature regions. In addition, it can be expected that the uniqueness of specific information increases as the number of addresses to be selected increases.

4. Detailed Configuration Example of Circuit Device

Figure 11:
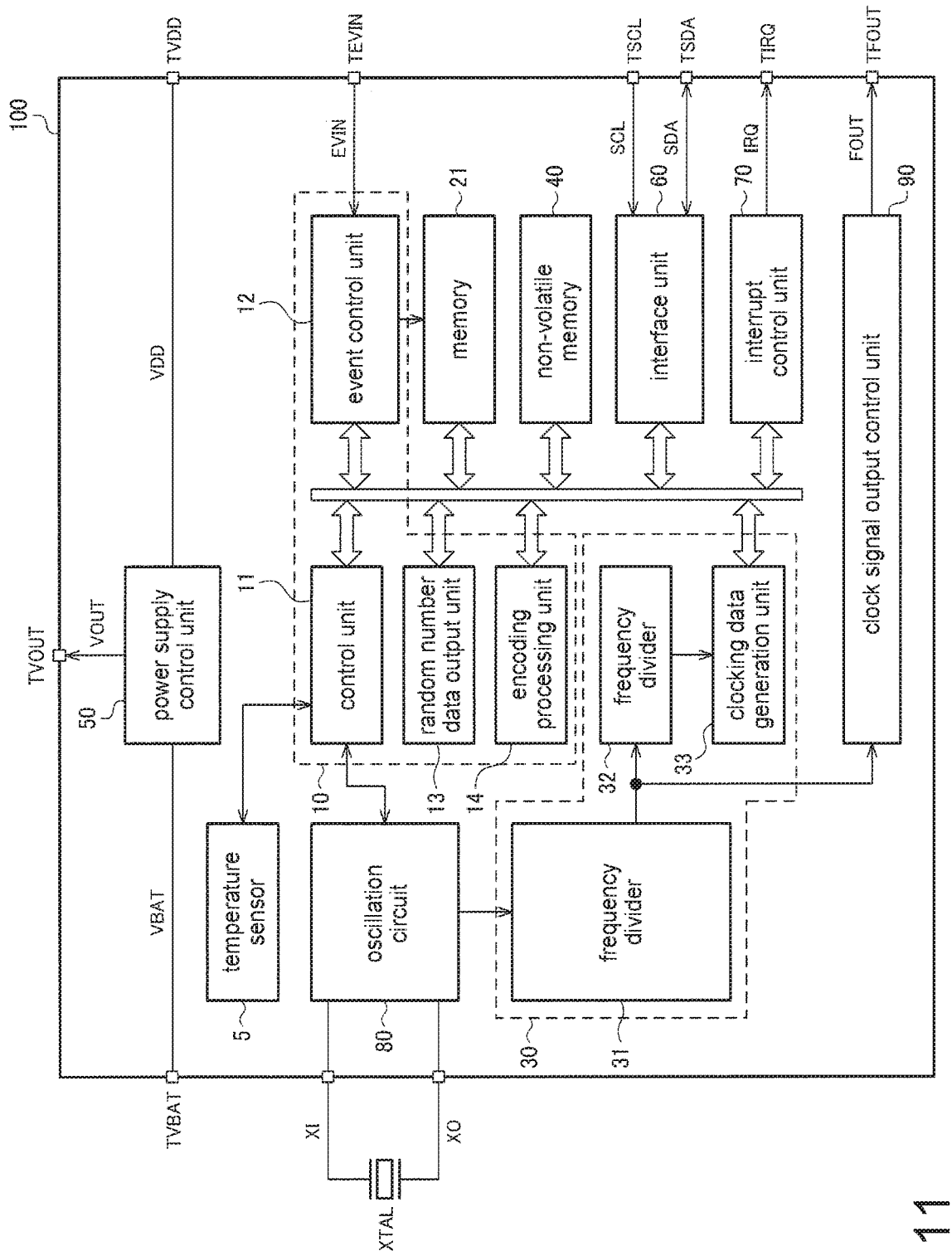
FIG. 11 illustrates a detailed configuration example of the circuit device according to this exemplary embodiment.

FIG. 11 illustrates a detailed configuration example of the circuit device 100 according to this exemplary embodiment. The circuit device 100 includes the processing circuit 10 (processing circuit), a memory 21, the non-volatile memory 40 (storage circuit), the clocking unit 30 (clocking circuit), and the temperature sensor 5. In addition, the circuit device 100 includes a power supply control unit 50 (power supply control circuit), the interface circuit 60 (interface circuit), an interrupt control unit 70 (interrupt control circuit), the oscillation circuit 80, a clock signal output control unit 90 (clock signal output circuit), terminals TVBAT, TVOUT, TVDD, TEVIN, TSCL, TSDA, TIRQ, TFOUT, XI, and XO. Meanwhile, the same components as the components described in FIG. 1 and the like are denoted by the same reference numerals and signs, and a description thereof will be appropriately omitted. Here, the circuit device is not limited to the configuration of FIG. 11, and various modifications such as the omission of a portion of the components and the addition of other components can be made thereto.

A backup power supply voltage VBAT supplied from a backup power supply is input to the terminal TVBAT. A main power supply voltage VDD supplied from the main power supply is input to the terminal TVDD. The power supply control unit 50 selects the main power supply voltage VDD or the backup power supply voltage VBAT, and supplies the selected voltage to each unit of the circuit device 100 as a voltage VOUT (internal power supply voltage of the circuit device 100). Specifically, the power supply control unit selects the main power supply voltage VDD in a case where the main power supply voltage VDD exceeds a predetermined voltage, and selects the backup power supply voltage VBAT in a case where the main power supply voltage VDD is less than the predetermined voltage. For example, the power supply control unit 50 includes a comparator that compares the main power supply voltage VDD and the predetermined voltage with each other, and an analog switch circuit of which the turn-on and turn-off are controlled on the basis of an output of the comparator.

The processing circuit 10 includes a control unit 11 that controls each unit of the circuit device 100, and an event control unit 12 that performs an event control process.

Specifically, a signal EVIN indicating whether or not an event (external event) has occurred is input to the event control unit 12 through the terminal TEVIN from the outside of the circuit device 100. In a case where the signal EVIN changes from a non-active state to an active state, the event control unit 12 notifies the control unit 11 of the change. In a case where the control unit 11 receives the notification, the control unit writes a time stamp (clocking data) of the event in the memory 21. The memory 21 is a RAM such as an SRAM.

The random number data output unit 13 outputs random number data to be combined with specific information. The control unit 11 combines the specific information and the random number data with each other to generate authentication information, and outputs the combined data to the encoding processing circuit 14. The encoding processing circuit 14 encodes the authentication information and outputs the encoded information to the interface circuit 60.

The oscillation circuit 80 is connected to one end of the resonator XTAL through the terminal XI and is connected to the other end of the resonator XTAL through the terminal XO to drive and oscillate the resonator XTAL. The oscillation circuit 80 has a configuration as described in, for example, FIG. 7, but the invention is not limited thereto. For example, in a case where temperature compensation is not performed, the variable capacitance circuit 82 may be omitted.

The resonator XTAL is a piezoelectric vibrator such as a quartz crystal vibrator. Alternatively, the resonator XTAL may be a resonator (an electromechanical resonator or an electrical resonance circuit). Examples of the resonator XTAL to be adopted may include a piezoelectric vibrator, a Surface Acoustic Wave (SAW) resonator, a Micro Electro Mechanical Systems (MEMS) vibrator, and the like. Examples of a substrate material of the resonator XTAL to be used may include a piezoelectric material such as piezoelectric single crystal, for example, quartz crystal, lithium tantalate, and lithium niobate, piezoelectric ceramics, for example, lead zirconate titanate, a silicon semiconductor material, and the like. As excitation means of the resonator XTAL, excitation means based on a piezoelectric effect may be used, or electrostatic driving based on a Coulomb force may be used.

The clocking unit 30 includes a frequency divider 31 that performs frequency division of the oscillation signal generated by the oscillation circuit 80 to generate a clock signal having a predetermined frequency (for example, 1 kHz), a frequency divider 32 that further performs frequency division of the clock signal generated by the frequency divider 31 to generate a clock signal of 1 Hz, and a clocking data generation unit 33 that counts the clock signals of 1 Hz to generate clocking data.

For example, the clocking data generation unit 33 includes a counter that counts clock signals of 1 Hz, and a conversion unit that converts a counted value of the counter into clocking data (data of year, month, day, hour, minute, and second). An initial value of the clocking data is written through the interface circuit 60 when the circuit device 100 (real-time clocking device) is first turned on, and the clocking data is updated per second, starting from the initial value.

The clock signal output control unit 90 selects any one of a plurality of clock signals (the clock signals have different frequencies) based on an oscillation signal, and outputs the selected clock signal to the outside of the circuit device 100 from the terminal TFOUT as a clock signal FOUT. In addition, the clock signal output control unit 90 can also set the clock signal FOUT to be in a non-active state (a non-output state, a stop state).

The interface circuit 60 performs digital interface communication between an external device and the circuit device 100. For example, the interface circuit 60 is a circuit that performs serial interface communication such as an I2C system or an SPI system. FIG. 11 illustrates a case using the I2C system, and the interface circuit 60 inputs and outputs a serial data signal SDA through the terminal TSDA on the basis of a clock signal SCL which is input from the terminal TSCL.

The interrupt control unit 70 performs control for outputting an interrupt signal IRQ to an external device through the terminal TIRQ. For example, in a case where the occurrence of an event is detected by the event control unit 12, the interrupt control unit 70 sets the interrupt signal IRQ to be in an active state.

Meanwhile, the processing circuit 10, the clocking unit 30, the interface circuit 60, the interrupt control unit 70, and the clock signal output control unit 90 are constituted by a logic circuit such as a gate array.

Figure 12:
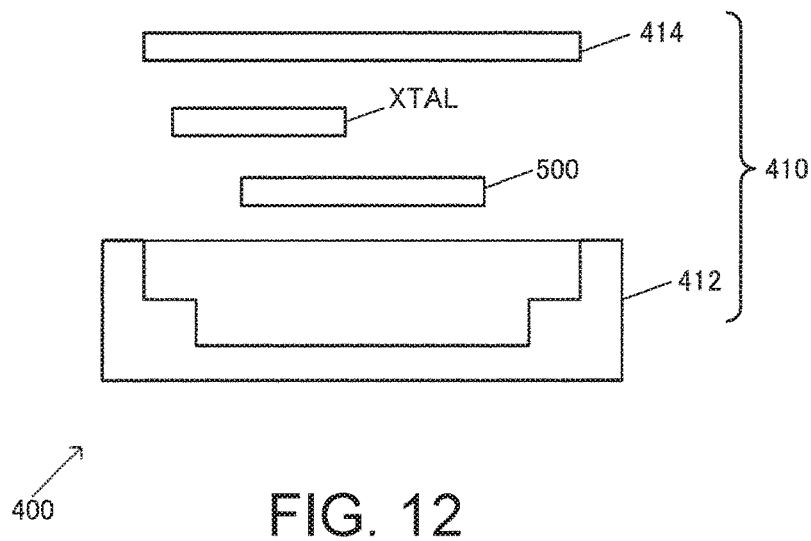
FIG. 12 illustrates a configuration example of an oscillator.

5. Oscillator, Physical Quantity Measurement Device, Electronic Apparatus, and Vehicle FIG. 12 illustrates a configuration example of an oscillator including the circuit device according to this exemplary embodiment. An oscillator 400 includes the circuit device 500 and the resonator XTAL (vibrator, vibrator element). In addition, the oscillator 400 may include a package 410 in which the circuit device 500 and the resonator XTAL are accommodated. Meanwhile, the oscillator is not limited to the configuration of FIG. 12, and various modifications such as the omission of a portion of the components and the addition of other components can be made thereto.

The oscillator 400 is, for example, a real-time clocking device or an oscillator that does not have a real-time clocking function. The oscillator is, for example, a Simple Packaged Crystal Oscillator (SPXO), a Temperature Compensated Crystal Oscillator (TCXO), an Oven Controlled Crystal Oscillator (OCXO), or the like. In a case of the real-time clocking device, the circuit device 500 corresponds to, for example, the circuit device 100 of FIG. 1 or 11. In a case of the resonator, the circuit device 500 includes, for example, the oscillation circuit 80, the processing circuit 10, and the interface circuit 60. In addition, the circuit device 500 may include, for example, a temperature sensor and an A/D conversion circuit.

The package 410 includes, for example, a base portion 412 and a lid portion 414. The base portion 412 is, for example, a box-shaped member including an insulating material such as ceramic, and the lid portion 414 is, for example, a flat plate-shaped member which is bonded to the base portion 412. For example, the bottom surface of the base portion 412 is provided with an external connection terminal (external electrode) for connection to an external apparatus. The circuit device 500 and the resonator XTAL are accommodated in an inner space (cavity) formed by the base portion 412 and the lid portion 414. The circuit device 500 and the resonator XTAL are airtightly sealed in the package 410 by the lid portion 414. The circuit device 500 and the resonator XTAL are mounted within the package 410. A terminal of the resonator XTAL and a terminal (pad) of the circuit device 500 (IC) are electrically connected to each other by an internal wiring of the package 410.

FIG. 13 illustrates a configuration example of a physical quantity measurement device including the circuit device according to this exemplary embodiment. Hereinafter, a description will be given of an example of a case where the physical quantity measurement device is a time-to-digital converter (TDC). However, the invention is not limited thereto, and the physical quantity measurement device may be a device (sensor) that measures a physical quantity by using a resonator. For example, the physical quantity measurement device may be a gyro sensor (vibration gyro).

A physical quantity measurement device 700 of FIG. 13 includes resonators XTAL1 and XTAL2 and a circuit device 750. The circuit device 750 includes oscillation circuits 710 and 720, a synchronization circuit 730, a time-to-digital conversion circuit 740, the processing circuit 10, and the interface circuit 60. Meanwhile, the physical quantity measurement device is not limited to the configuration of FIG. 13, and various modifications such as the omission of a portion (for example, the synchronization circuit) of the components and the addition of other components can be made thereto.

The oscillation circuit 710 oscillates the resonator XTAL1 to generate a first clock signal CK1 having a first clock frequency f1. The oscillation circuit 720 oscillates the resonator XTAL2 to generate a second clock signal CK2 having a second clock frequency f2. The synchronization circuit 730 is a circuit that synchronizes phases of the first clock signal CK1 and the second clock signal CK2 with each other for each predetermined cycle and is, for example, a PLL circuit. The time-to-digital conversion circuit 740 converts a time difference in transition timing between a first signal STA (start signal) and a second signal STP (stop signal) into a digital value DQ with a resolution corresponding to a frequency difference between the first clock signal CK1 and the second clock signal CK2. Meanwhile, the time-to-digital conversion circuit 740 may output (spontaneously issue) the first signal STA on the basis of the first clock signal DK1. The processing circuit 10 controls each unit of the circuit device 100. In addition, the processing circuit 10 outputs a digital value DQ or data generated on the basis of the digital value DQ to an external device through the interface circuit 60. In addition, the processing circuit 10 performs an authentication process described in FIG. 1 and the like. Meanwhile, the circuit device 750 may include a non-volatile memory that stores temperature compensation data, and the processing circuit 10 may generate PUF information on the basis of the temperature compensation data. For example, the processing circuit may output authentication information to an external device on the basis of the PUF information.

Figure 14:
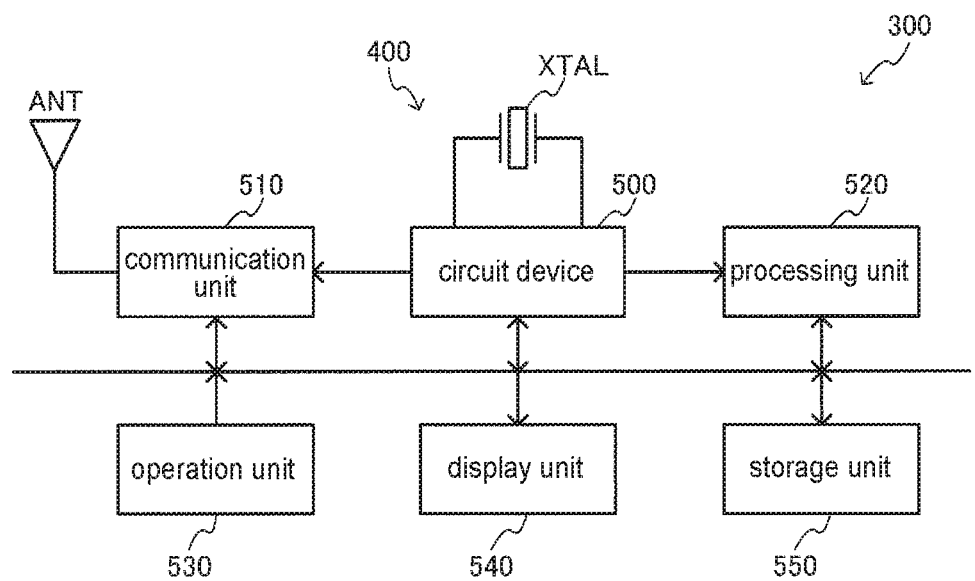
FIG. 14 illustrates a configuration example of an electronic apparatus.

FIG. 14 illustrates a configuration example of an electronic apparatus 300 including the circuit device according to this exemplary embodiment. The electronic apparatus 300 includes a circuit device 500, an resonator XTAL such as a quartz crystal vibrator, an antenna ANT, a communication unit 510 (communication device), and a processing circuit 520 (processing device). In addition, the electronic apparatus may include an operation unit 530 (operation device), a display unit 540 (display device), and a storage circuit 550 (memory). The oscillator 400 is constituted by the resonator XTAL and the circuit device 500. Meanwhile, the electronic apparatus 300 is not limited to the configuration of FIG. 14, and various modifications such as the omission of a portion of the components and the addition of other components can be made thereto. For example, the physical quantity measurement device 700 may be provided instead of the oscillator 400.

Examples of the electronic apparatus 300 of FIG. 14 which is to be assumed may include an on-vehicle electronic device such as an Electronic Control Unit (ECU) or a meter panel, a video apparatus such as a digital camera or a video camera, and a printing apparatus such as a printer or a multi-function printer. Alternatively, it is possible to assume various apparatuses, for example, a wearable apparatus such as a GPS-incorporated time piece, a biological information measurement apparatus (a pulse wave meter, a pedometer, or the like) or a head-mounted display device, a portable information terminal (mobile terminal) such as a smartphone, a mobile phone, a portable game device, a notebook PC, or a tablet PC, a content provision terminal that distributes a content, and a network-related apparatus such as a base station or a router.

The communication unit 510 (wireless circuit) performs a process of receiving data from the outside through the antenna ANT and transmitting data to the outside. The processing circuit 520 performs control processing of the electronic apparatus 300, various digital processing of data transmitted and received through the communication unit 510, and the like. The function of the processing circuit 520 can be realized by a processor such as a micro-computer. The operation unit 530 is a unit for causing a user to perform an input operation, and can be realized by an operation button, a touch panel display, or the like. The display unit 540 is a unit for displaying various pieces of information, and can be realized by a display such as a liquid crystal display or an organic EL. Meanwhile, in a case where a touch panel display is used as the operation unit 530, the touch panel display can also serve as the operation unit 530 and the display unit 540. The storage circuit 550 stores data, and the function thereof can be realized by a semiconductor memory such as a RAM or a ROM, a hard disk drive (HDD), or the like.

Figure 15:
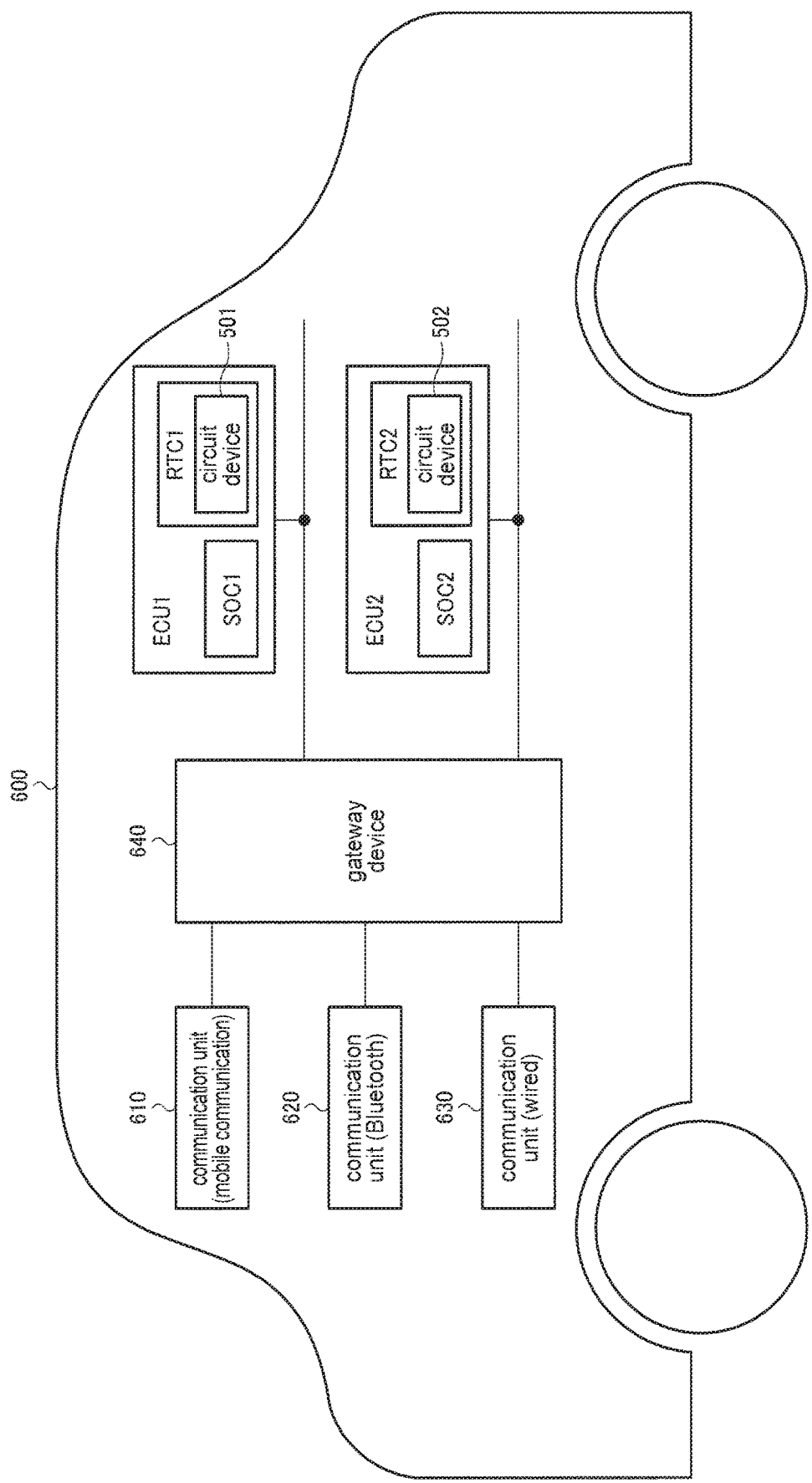
FIG. 15 illustrates a configuration example of a vehicle.

FIG. 15 illustrates an example of a vehicle including the circuit device according to this exemplary embodiment. The circuit device (oscillator, physical quantity measurement device) according to this exemplary embodiment can be embedded in various vehicles such as a car, an airplane, a motorcycle, a bicycle, and a ship. The vehicle is an apparatus or a device that moves on the ground and in the sky and the sea by including a driving mechanism such as an engine or a motor, a steering mechanism such as a handle or a rudder, and various electronic apparatuses (on-vehicle apparatus). FIG. 15 schematically illustrates an automobile 600 as a specific example of the vehicle. The automobile 600 includes a communication unit 610 that performs mobile communication such as portable wireless communication, a communication unit 620 that performs Bluetooth (registered trademark) communication, a communication unit 630, such as a USB, which performs wired communication, a gateway device 640 that performs gateway processing of an internal network together with the communication units, and control units (control devices) ECU1 and ECU2 that are connected to the internal network. The control units ECU1 and ECU2 are control units that perform system control, such as engine control, which is related to traveling, control units that perform the control of a system related to a body, such as the opening and closing of a door, control units, such as car audios, which perform information processing, or the like. The control unit ECU1 includes a processing device SOC1 (external device), and a real-time clocking device RTC1 that communicates with the processing device SOC1. The real-time clocking device RTC1 includes a circuit device 501. The control unit ECU2 includes a processing device SOC2 (external device), and a real-time clocking device RTC2 that communicates with the processing device SOC2. The real-time clocking device RTC2 includes a circuit device 502. The circuit devices 501 and 502 correspond to, for example, the circuit device 100 of FIG. 1 or 11. Meanwhile, the control units ECU1 and ECU2 may include an oscillator other than the real-time clocking device, or may include a physical quantity measurement device (the circuit device 750 of FIG. 13).

While this exemplary embodiment has been described in detail, one skilled in the art can easily understand that a number of modifications can be made without substantially departing from the new matters and effects of the invention. Therefore, all such modifications are included in the scope of the invention. For example, a term described at least once along with a different term having a broader meaning or the same meaning in the description or drawings can be replaced with the different term at any location in the description or drawings. In addition, all combinations of this exemplary embodiment and the modification examples are included in the scope of the invention. In addition, the configurations and operations of the circuit device, the oscillator, the physical quantity measurement device, the electronic apparatus, and the vehicle are not limited to those described in this exemplary embodiment and can be modified in various ways.

The entire disclosure of Japanese Patent Application No. 2017-010046, filed Jan. 24, 2017 is expressly incorporated by reference herein.

What is claimed is:

1. A circuit device comprising:
   an oscillation circuit configured to generate an oscillation signal;
   a processing circuit configured to control the oscillation circuit; and
   a storage circuit configured to store temperature compensation data of an oscillation frequency of the oscillation signal,
   wherein the processing circuit generates specific Physically Unclonable Function information of the circuit device based on the temperature compensation data,
   wherein the circuit device outputs the Physically Unclonable Function information as generated by the processing circuit to an external device that is configured to use the Physically Unclonable Function information to perform an authentication of the circuit device,
   wherein the temperature compensation data corresponds to adjustment data, wherein the adjustment data is a change in a capacitance value, wherein the capacitance value has a temperature characteristic having a secondary function, and wherein the adjustment data includes at least first adjustment data that is stored in a first address of a plurality of addresses indexed to a first temperature less than a peak temperature of the temperature characteristic, second adjustment data that is stored in a second address of the plurality of addresses indexed to a second temperature greater than the peak temperature of the temperature characteristic, and third adjustment data that is stored in a third address of a plurality of addresses indexed to a third temperature between the first temperature and the second temperature, and
   wherein the processing circuit generates the specific Physically Unclonable Function information by retrieving at least two of the first adjustment data, the second adjustment data, and the third adjustment data.

2. The circuit device according to claim 1, further comprising:
   an encoding processing circuit configured to perform an encoding process based on the specific Physically Unclonable Function information.

3. The circuit device according to claim 1,
   wherein the processing circuit extracts data of a predetermined number of bits from the temperature compensation data to generate the specific Physically Unclonable Function information.

4. The circuit device according to claim 2,
   wherein the processing circuit extracts data of a predetermined number of bits from the temperature compensation data to generate the specific Physically Unclonable Function information.

5. The circuit device according to claim 1,
wherein the oscillation circuit includes a variable capacitance circuit for temperature compensation, and
wherein the adjustment data is data for adjusting the capacitance value of the variable capacitance circuit.

6. The circuit device according to claim 2,
wherein the oscillation circuit includes a variable capacitance circuit for temperature compensation, and
wherein the adjustment data is data for adjusting the capacitance value of the variable capacitance circuit.

7. The circuit device according to claim 3,
wherein the oscillation circuit includes a variable capacitance circuit for temperature compensation, and
wherein the adjustment data is data for adjusting the capacitance value of the variable capacitance circuit.

8. The circuit device according to claim 4,
wherein the oscillation circuit includes a variable capacitance circuit for temperature compensation, and
wherein the adjustment data is data for adjusting the capacitance value of the variable capacitance circuit.

9. The circuit device according to claim 1, further comprising:
a clock module configured to generate clocking data based on the oscillation signal, the clocking data being real-time clock information; and
an interface circuit configured to output the clocking data to an external device.

10. The circuit device according to claim 2, further comprising:
a clock module configured to generate clocking data based on the oscillation signal, the clocking data being real-time clock information; and
an interface circuit configured to output the clocking data to an external device.

11. The circuit device according to claim 3, further comprising:
a clock module configured to generate clocking data based on the oscillation signal, the clocking data being real-time clock information; and
an interface circuit configured to output the clocking data to an external device.

12. The circuit device according to claim 5, further comprising:
a clock module configured to generate clocking data based on the oscillation signal, the clocking data being real-time clock information; and
an interface circuit configured to output the clocking data to an external device.

13. An oscillator comprising:
the circuit device according to claim 1; and
a resonator.

14. A physical quantity measurement device comprising:
the circuit device according to claim 1; and
a resonator.

15. An electronic apparatus comprising the circuit device according to claim 1.

16. A vehicle comprising the circuit device according to claim 1.

* * * * *